US010534584B2

(12) United States Patent
Pakiman et al.

(10) Patent No.: US 10,534,584 B2
(45) Date of Patent: Jan. 14, 2020

(54) ENHANCED SOFTWARE APPLICATION ECOSYSTEM

(71) Applicant: SAP SE, Walldorf (DE)

(72) Inventors: Rouja Pakiman, Mountain View, CA (US); Michael Krenkler, Wiesloch (DE); Megan Elizabeth Zurcher, San Francisco, CA (US); Timo Hoyer, South San Francisco, CA (US); Cynthia Lam, Santa Clara, CA (US); Sarah Brose, Emerald Hills, CA (US); Susann Graeff, Angelbachtal (DE); Jeong Sook Lee, Walldorf (DE); Wirithphol Ek-Ularnpun, Sunnyvale, CA (US)

(73) Assignee: SAP SE, Walldorf (DE)

(*) Notice: Subject to any disclaimer, the term of this patent is extended or adjusted under 35 U.S.C. 154(b) by 213 days.

(21) Appl. No.: 15/585,588

(22) Filed: May 3, 2017

(65) Prior Publication Data

US 2017/0322782 A1 Nov. 9, 2017

Related U.S. Application Data

(60) Provisional application No. 62/331,613, filed on May 4, 2016.

(51) Int. Cl.

| | |
|---|---|
| ***G06F 8/33*** | (2018.01) |
| ***G06F 8/34*** | (2018.01) |
| ***G06F 8/38*** | (2018.01) |
| ***G06F 8/41*** | (2018.01) |
| *G06F 8/20* | (2018.01) |
| *G06F 8/60* | (2018.01) |

(52) U.S. Cl.

CPC .................. *G06F 8/33* (2013.01); *G06F 8/34* (2013.01); *G06F 8/38* (2013.01); *G06F 8/447* (2013.01); *G06F 8/20* (2013.01); *G06F 8/60* (2013.01)

(58) Field of Classification Search

CPC ... G06F 8/34; G06F 8/38; G06F 8/447; G06F 8/20; G06F 8/33; G06F 8/60

See application file for complete search history.

(56) References Cited

U.S. PATENT DOCUMENTS

| | | | | |
|---|---|---|---|---|
| 7,590,669 | B2 | 9/2009 | Yip et al. | |
| 7,685,206 | B1 | 3/2010 | Mathew et al. | |
| 7,703,092 | B1 * | 4/2010 | Glaser | G06F 8/60 717/121 |
| 9,324,239 | B2 | 4/2016 | Krebs et al. | |
| 9,507,609 | B2 | 11/2016 | Glazer et al. | |
| 2007/0260737 | A1 | 11/2007 | Gomes et al. | |
| 2009/0171484 | A1 * | 7/2009 | Birze | G05B 19/042 700/86 |
| 2011/0321024 | A1 | 12/2011 | Knothe et al. | |
| 2013/0219307 | A1 | 8/2013 | Raber et al. | |
| 2018/0210622 | A1 | 7/2018 | Back | |
| 2018/0210717 | A1 | 7/2018 | Back | |
| 2018/0336348 | A1 | 11/2018 | Ng et al. | |

* cited by examiner

*Primary Examiner* — Jacob D Dascomb

(74) *Attorney, Agent, or Firm* — Fish & Richardson P.C.

(57) ABSTRACT

An ecosystem supporting the design and the construction of software applications (Apps) is described. Such an ecosystem supports rapid and efficient design of Apps that provide a consistent user experience through one or more user interfaces.

20 Claims, 29 Drawing Sheets

600

625

ENHANCED SOFTWARE APPLICATION ECOSYSTEM

CROSS-REFERENCE TO RELATED APPLICATIONS

This application claims priority to, and is a continuation of, U.S. Provisional Patent Application No. 62/331,613, filed on May 4, 2016, entitled "Enhanced Software Application Ecosystem", the disclosure of which is incorporated by reference herein in its entirety.

TECHNICAL FIELD

The present disclosure relates generally to an ecosystem that supports the design and the construction of software applications.

BACKGROUND

Software applications, which may for convenience be referred to hereinafter as Apps, may operate on or within any number of target devices including for example, any combination of one or more of a desktop computer, a laptop computer, a notebook computer, a tablet computing device, a smart phone, a smart watch, a (standard, ruggedized, etc.) Personal Digital Assistant (PDA), a handheld computing device, or other computer-enabled devices.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method that includes receiving, a request to generate an application, the request including at least one user device indication and an application context, generating, for the at least one indicated user device and using a design language and the application context, a definition for the application, the design language including a plurality of user interface aspects; selecting, using the design language, a subset of the user interface aspects, the subset of the user interface aspects being selected based on the definition and the at least one indicated user device, providing, the subset of the user interface aspects in a graphical user interface, receiving a plurality of selections of user interface aspects, the plurality of selections of user interface aspects being a portion of the subset. The method may also include generating, using the definition, the plurality of selections of user interface aspects, and at least one predefined artifact, the application, and deploying the generated application for the indicated device. Other embodiments of this aspect include corresponding computer systems, apparatus, and computer programs recorded on one or more computer storage devices, each configured to perform the actions of the methods.

Implementations may include one or more of the following features. The computer-implemented method where the generated application includes configuration information for executing the application and a user interface providing a user experience based at least in part on the context and the indicated device. The computer-implemented method where the request further includes identification of a specification of an integrated development environment (IDE). The computer-implemented method where the design language specifies, for the application, at least one template, at least one layout, at least one user interface asset, and at least one navigation paradigm. The computer-implemented method where the at least one predefined artifact includes a library, a template, a user experience definition, a software development kit (SDK), and a user interface standard. The computer-implemented method where the user interface aspects of the generated application are operable on any combination of one or more of a desktop computer, a laptop computer, a notebook computer, a tablet computing device, a smart phone, a smart watch, a personal digital assistant (PDA), and a handheld computing device. The computer-implemented method where the user interface aspects of the generated application are operable on any combination of one or more of a native environment, a web-based environment, a hybrid environment, and a containerized environment. Implementations of the described techniques may include hardware, a method or process, or computer software on a computer-accessible medium.

In another general aspect, a computer-implemented system is described for generating a software application, the system including at least one processor, memory storing instructions that, when executed by the at least one processor, cause the system to perform particular operations. The operations may include receiving, a request to generate an application, the request including at least one user device indication and an application context, generating, for the at least one indicated user device and using a design language and the application context, a definition for the application, the design language including a plurality of user interface aspects, selecting, using the design language, a subset of the user interface aspects, the subset of the user interface aspects being selected based on the definition and the at least one indicated user device, providing, the subset of the user interface aspects in a graphical user interface, receiving a plurality of selections of user interface aspects, the plurality of selections of user interface aspects being a portion of the subset, generating, using the definition, the plurality of selections of user interface aspects, and at least one predefined artifact, the application, and deploying the generated application for the indicated device.

Implementations may include one or more of the following features. The computer-implemented system where the generated application includes configuration information for executing the application and a user interface providing a user experience based at least in part on the context and the indicated device. The computer-implemented system where the request further comprises identification of a specification of an Integrated Development Environment (IDE). The computer-implemented system where the design language specifies, for the application, at least one template, at least one layout, at least one user interface asset, and at least one navigation paradigm. The computer-implemented system where the at least one predefined artifact comprises a library, a template, a user experience definition, a Software Development Kit (SDK), and a user interface standard. The computer-implemented system where the user interface aspects of the generated application are operable on any combination of one or more of a desktop computer, a laptop computer, a notebook computer, a tablet computing device, a smart phone, a smart watch, a Personal Digital Assistant (PDA), and a handheld computing device. The computer-implemented system where the user interface aspects of the generated application are operable on any combination of one or more of a native environment, a web-based environment, a hybrid environment, and a containerized environment.

In another general aspect, a computer program product for generating a software application, the computer program product being tangibly embodied on a non-transitory computer-readable storage medium and comprising instructions that, when executed by at least one computing device, are configured to cause the at least one computing device to receive, a request to generate an application, the request including at least one user device indication and an application context, generate, for the at least one indicated user device and using a design language and the application context, a definition for the application, the design language including a plurality of user interface aspects, select, using the design language, a subset of the user interface aspects, the subset of the user interface aspects being selected based on the definition and the at least one indicated user device, provide, the subset of the user interface aspects in a graphical user interface, receive a plurality of selections of user interface aspects, the plurality of selections of user interface aspects being a portion of the subset, generate, using the definition, the plurality of selections of user interface aspects, and at least one predefined artifact, the application, and deploy the generated application for the indicated device.

Implementations may include one or more of the following features. The computer program product where the generated application includes configuration information for executing the application and a user interface providing a user experience based at least in part on the context and the indicated device. Implementations may include one or more of the following features. The computer program product where the request further comprises identification of a specification of an Integrated Development Environment (IDE). The computer program product where the design language specifies, for the application, at least one template, at least one layout, at least one user interface asset, and at least one navigation paradigm. The computer program product where the user interface aspects of the generated application are operable on any combination of one or more of a native environment, a web-based environment, a hybrid environment, and a containerized environment. The computer program product where the user interface aspects of the generated application are operable on any combination of one or more of a desktop computer, a laptop computer, a notebook computer, a tablet computing device, a smart phone, a smart watch, a Personal Digital Assistant (PDA), and a handheld computing device.

Other embodiments of this aspect include corresponding computer systems, apparatus, and computer programs recorded on one or more computer storage devices, each configured to perform the actions of the methods.

According to another general aspect, a computer program product may be tangibly embodied on a computer-readable medium and may include executable code that, when executed, is configured to cause at least one data processing apparatus to perform the following operations.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
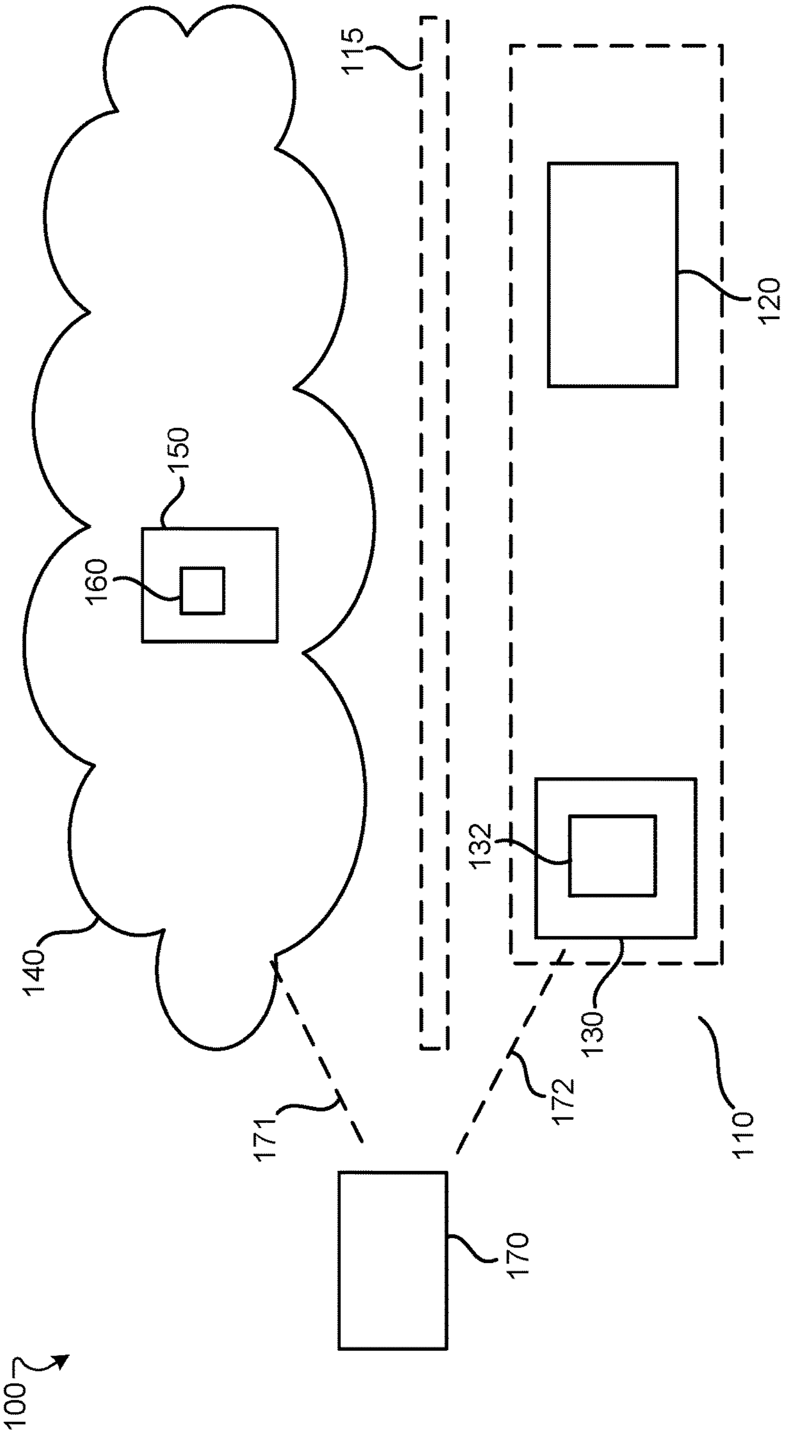
FIG. 1 depicts aspects of an example architecture.

The systems and methods described herein may provide an ecosystem for accessing a design language that supports rapid design and construction of consistent and compliant software applications (i.e., Apps). The design and construction can be performed by a developer (that develops applications for companies) and/or by an end user (that personalizes applications for herself). Thus, any number of the design components used to generate applications may be drag-and-drop, WYSIWYG smart templates, and/or menu based to enable an end user to generate custom business objects, logic, adapt reports and forms, manage or add custom fields, and/or modify fields in existing application user interfaces. In some implementations, the development can occur and be implemented at runtime of such applications.

The software applications generated by the systems and methods described herein may be flexible in that each single application can present a varied version of a user experience (UX) through a user interface (UI) that is tailored per user, per platform (e.g., operating system, device type, etc.), and/or per user role. The variation may be driven by features, functions, and/or capabilities supported by a device or available software installed on the device that is operating each particular software application described herein. For example, the operating system and/or make and model of a computing device may be used to trigger which particular portions or options are provided in the UI of one or more applications. In another example, devices connected to the Internet (or other network) may provide different user interfaces for one or more applications than applications displayed on devices that are disconnected from the Internet (or other network). In this way, a software application (i.e., App) consumer can conveniently be provided tailored content and options within each application based on one or more available (or unavailable) features and/or role associated with the user. In some implementations, such applications may present compliant user interfaces that provide the advantage of allowing the user to access available features that may be updated as the user environment or connectivity status is changed.

In operation, the methods and systems described herein may use an application design module, an application construction module, and an application deployment module to generate and enable users to generate and/or modify applications (i.e., Apps). The application design module may leverage and employ various UI controls, layouts, and floor plans to yield various definitional materials including, for example, metadata and configurations. In some implementations, the application design module may be employed to define an application using a design language. Using the design language to define and select a number of supporting elements such as libraries and/or building blocks (e.g., templates), the application construction module may generate an application. The application deployment module may then publish and deploy the application for other users and the developing user to access.

In general, the building blocks (e.g., templates) may pertain to the design language used to generate applications for a particular operating system. For example, if the operating system is iOS® from Apple, Inc., then particular design language rules can be applied to generate applications for iOS®. The design language can be used to generate applications for iOS® that provide access to enterprise data and business processes on SAP s/4HANA, for example, while making full use of the native features of the iPhone®, iPad®, and Apple Watch®, including, but not limited to Touch ID, 3D Touch, location services, and notifications.

The design language described herein may provide action sheets, branding buttons, check marks, contact cells, create functionality, error handling, feedback, and filtering functionality. The design language described herein may also provide collection views, gallery views, modal views, overviews, scan views, split views, summary views, table views, timeline views, timeline previews, and navigation bars. The design language described herein may also provide headers, labels, label/value cells, and list reports.

The design language described herein may also provide keyboards/custom keyboards, pickers, search, sliders, segmented controls, status bars, switches, text areas, and work lists. The design language described herein may also provide key performance indicators, objects, object cells, and object details. The design language described herein may also provide offline functionality, onboarding functionality, and profiles/settings.

In some implementations, particular layout standards associated with Apple, Inc. products (e.g., iPhone®, iPad®, etc.) may be used to build a coherent visual experience without disturbing the visual rhythm of the platform standards. Avoiding large gaps between elements, or squeezed content can be a design rule employed as functional templates are dropped into the application. In some implementations, the design rule may adhere to an external specification. For example, the iOS Human Interface Guidelines define a comfortable minimum size of tap-able UI elements as 44×44 px. On a retina display, two pixels are the equivalent of one, so the minimum size is 88×88 px. The grid serves as a flexible reference layout for positioning the tap-able UI controls, resulting in improved balance and data coherence. The applications generated by the systems and methods described herein can be configured to adhere to such guidelines.

The design language can be used to employ any combination of operating paradigms including, for example, any combination of one or more of native, web-based, hybrid, and/or containerized operating paradigms. The operating paradigms can be used to leverage any number of infrastructure paradigms including, for example, any combination of one or more of on-premise, cloud, Software as a Service (SAAS), edge computing, grid computing, and/or Platform as a Service (PAAS). In some implementations, devices using particular operating systems may include specific features to allow modification of existing application user interfaces. For example, specific pixel presentation of Apple, Inc. devices may enable finer resolutions for user interfaces and/or the addition of more interface content than a device belonging to another manufacturer.

FIG. 1 presents a simplified diagram of aspects of an example architecture 100. Architecture 100 may include or represent a distributed architecture. In one implementation, the architecture 100 may include or be hosted in a cloud computing server 140. The cloud 140 may, for example, include one or more servers. The servers may be interconnected through a communication network including any combination of one or more of an internet, an intranet, a Local Area Network (LAN), a Wide Area Network (WAN), and the like. The servers of a cloud may be physically located in a single location or in multiple locations.

Such facilities may be considered as services provided by the cloud 140. Any number of services may be provided including for example the SAP HANA Cloud Platform. Such services may be offered through a public, a private, or a hybrid network. The services may be provided by a cloud service provider.

The cloud 140 may include, among other things, an application server 150. The application server 150 may be configured to host and/or support any number of Apps (i.e., applications) 160. The cloud 140 may also include one or more resource servers (not shown). A resource server may, for example, be configured to host data or other resources used by an application. The cloud 140 may also include one or more proxy servers (not shown). A proxy server may, for example, manage connections to data sources.

Architecture 100 may include one or more target devices 130. A target device may include a computing device with, for example, a local memory and a processor. The memory may be volatile or non-volatile types of non-transitory computer-readable media, such as magnetic media, optical media, RAM, ROM, removable media, or any other suitable local or remote memory component.

Target device 130 may be part of a local network 110 with other target devices (not shown) and a server 120. The local network may be a private network. For instance, the local network may be a network of a private entity, such as a company or an individual. Alternatively, the network may be a public network comprising resources such as for example Wi-Fi, 3G, 4G, 5G, Long Term Evolution (LTE), etc.

Other types of local networks may also be employed with architecture 100. The server of the local network may be referred to as a local server. The local server may include one or more computers. The computers may be connected through a communication network, such as internet, intranet, LAN, WAN or a combination thereof. In some implementations, a local server and a target device may be at the same location. In other implementations, a local server and a target device may reside at different locations. In some cases, a target device and a local server may be the same computer, system, etc. Other configurations of a local server and a target device may also be employed. For example, a target device may be connected to a server that is not in the local environment surrounding device 130. For security, a firewall 115 may be provided between the cloud and the local network. A firewall may ensure that resources that maybe located on a local server are secure from unwanted access.

A user may employ one or more Apps 132 on the target device 130 in support of work and activities carried out by the user. The Apps 132 may be designed to be adaptive with respect to layout and organization. For example, a display size or orientation of one or more computing devices may be taken into account at design time to ensure the Apps 132 can be displayed adaptively with proper views and content on each type of device. In one example, Apps can expand based on determining which device is providing the display of a particular App, rather than based on a predetermined scale expansion. In some implementations, at least two sizes for each device may be configured. For example a regular display mode and a compact display mode for each device can ensure a user can display Apps and application content on several types of devices and perceive the same effects.

In one example, an application (e.g., App) may have a consumer focus or orientation, supporting for example, an individual user as the user pursues activities. Such activities may include ordering a book online, making online travel arrangements, completing a personal banking transaction, just to name a few examples. Apps that support the above activities typically include a user interface (UI) with a User Experiences or UX that provides for user-intuitive operation.

In another example, an application may have an enterprise focus or orientation, supporting for example, the user (e.g., an enterprise user) as the user communicates and/or interacts with one or more backend data processing systems of an enterprise, such as an Enterprise Resource Planning (ERP) system, a Customer Relationship Management (CRM) system, a Supplier Relationship Management (SRM) system, a human resources system, a customer retail system, etc. Such Apps frequently have a UI with a UX that differs dramatically from a consumer-style UX that users have come to expect from an enterprise application (or set of Apps).

The FIORI®/SAP FIORI® UX initiative (which, for simplicity of exposition, may be referred to hereinafter as FIORI) applies modern design principles to deliver an attractive, consumer-style UX that is among other things personalized, responsive, simplified, and optimized and which may enable and empower users to generate consistent and coherent views across any target device. The UX can be generated using the systems and methods described herein to ensure that Apps in such enterprise systems are intuitive to use. FIORI facilitates, in a flexible and dynamically extensible way, an environment accessible by any number of users (e.g., tens, hundreds, thousands, tens of thousands, hundreds of thousands, etc.), in which each user has any number of roles. Each user may receive a personalized, responsive, simplified, and optimized UX as they employ any of many thousands of Apps, across any number of target devices, in support of different work activities carried out by the user.

Architecture 100 may also include an application designer and developer 170. The application developer 170 may include a range of software tools, facilities, libraries, building blocks, templates, UX definitions, UI standards, etc. that support the design and construction of Apps. The application developer 170 may include an Integrated Development Environment (IDE). The IDE may, for example, be wizard-based, may include command line facilities, etc. Aspects of an application developer 170 may leverage resources that reside within a portion of the cloud (e.g., communication 171) and/or a portion of a local network (communication 172).

Figure 2:
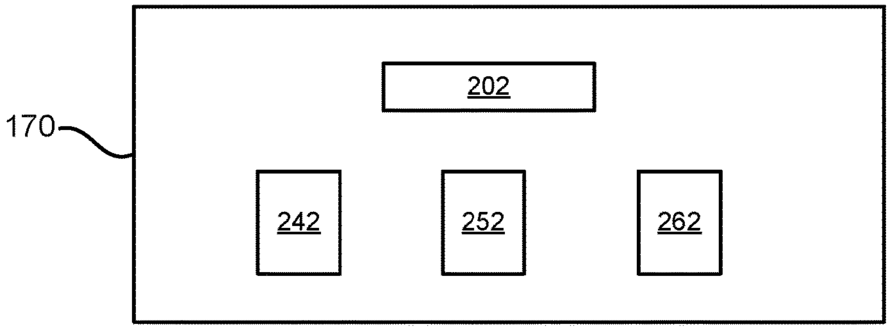
FIG. 2 is a block diagram depicting aspects of an application developer.

FIG. 2 is a block diagram depicting aspects of an application developer 170. In some implementations, the application developer 170 may include a UI module 202, an application design module 242, an application construction module 252, and an application deployment module 262. The UI module 202 may be a Graphical User Interface (GUI) module. The GUI module may facilitate a user in navigating an IDE as well as performing various functions by the different modules.

In general, an application may operate in (or within) any number of paradigms including, for example, any combination of one or more of native, web-based, hybrid, containerized, applications. Accordingly, aspects of the modules described herein may adapt or adjust portions of their activities to account for such combinations. For example, the application can provide functionality to adjust specific artifacts (e.g., aspects) that are generated, steps that are performed (such as the compilation of source code), and/or optimizations that are applied.

The application design module 242 may support rapid, consistent, definition and design of an application through the use of one or more wizards, templates, design components, plugins, checkers, etc. that support any number of paradigms including, but not limited to, Business to Business (B2B), Business to Customer (B2C), etc. The application design module 242 may leverage and employ various UI controls, layouts, and floor plans to yield various definitional materials including for example metadata and configurations.

The application construction module 252 may leverage any number of artifacts (such as output from an application design module 242). The application construction module 252 can generate, construct, and/or validate various artifacts. For example, the application construction module 252 may be used to construct and/or validate source code, configuration settings, wrappers, metadata, etc. for an application by leveraging various scripts, rules, and workflows.

The application deployment module 262 may leverage any number of artifacts (such as output from an application construction module 252 to package, validate, publish, release, announce, and/or push an application to a user accessing a computing system.

Figure 3:
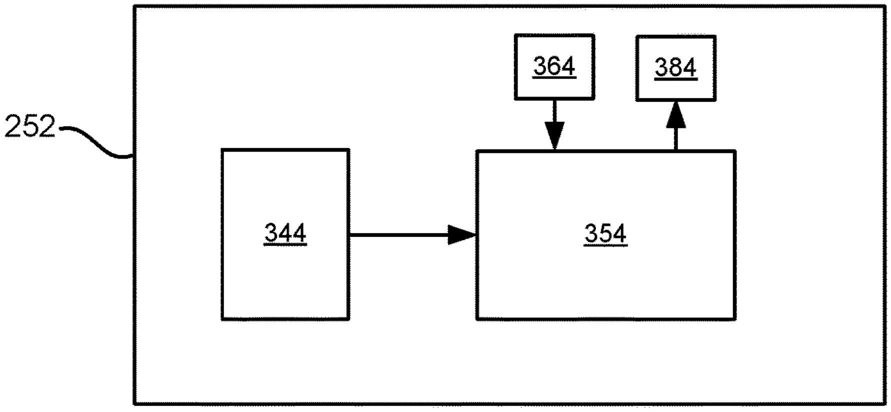
FIG. 3 depicts aspects of an application construction module.

FIG. 3 depicts aspects of the application construction module 252 that includes a source (e.g., a repository) of application definitions 344. The application definitions 344 may be defined using application design module 242, which may be supported by additional elements 364 (e.g., Software Development Kits (SDKs), libraries, templates, scripts), an application Construction Engine 354, and a constructed or generated application 384.

The application construction module 252 may provide lifecycle support and/or maintenance services for an application including, for example, patches, updates, and/or fixes, for aspects of the application. For example, depending upon the scope and impact of a change, an update to a portion of an application (e.g., changing elements of a Cascading Style Sheet (CSS) file) may be generated.

The application design module 242 of the application developer 170 may leverage aspects of a design language. Such a design language may encompass any number of elements and may allow for the efficient and expeditious expression of visual and functional aspects of an application.

In general, a design language may include (i.e., identify, offer, support, etc.) a range of elements including patterns, layouts, assets, animations, navigation paradigms, palettes, typography, iconography, and branding for example. Patterns may include arrangements (e.g., structures) of frequently employed frameworks. Layouts may include elements such as screen or display floor plans, arrangements, and/or templates. Assets may include elements such as display controls, data entry controls, or other control including for example, a status bar, a toolbar, a search bar, an alert or notification mechanism, a text field, a date picker, a slider, a switch, a radio button, a virtual keyboard, etc.

Animations may include various transition or simulation mechanisms that may support the migration from one screen or display to another screen or display. Navigation Paradigms may include mechanisms that support a user making transitions and/or a user's travels, including for example a navigation bar, screen/page/text selection indicators such as arrows or other control.

Color palette may include an array of color choices with among other things various hues, shadings, intensities selectable for an application interface. The typography may include particular size, shape or other textual aspect element within an application interface. The iconography may refer to a universe of visual images, symbols, for the application interface. The branding may refer to mechanisms, such as logos and colors, that support differentiation capabilities for particular application interfaces.

In one example, a particular design language may be used to capture, encapsulate aspects of FIORI. The design language can capture aspects of FIORI to offer a flexible, extensible, and dynamic set of KPI mechanisms. Such mechanisms may be dynamically configurable. For example, KPIs may include content (e.g., the data that may be displayed within a KPI) that may be live or real-time. The content may include canned (e.g., predetermined) remarks or custom remarks. A variety of actions may be associated with a KPI (e.g., events). Such actions may be triggered when a KPI is selected and/or invoked by the systems described herein (or invoked by a user).

A design language that captures aspects of FIORI may offer a flexible, extensible, and dynamically customizable keyboard. Such a facility may employ any type, style, or number of input mechanisms (e.g., keys, selectors, icons, etc.) including any combination of one or more of elements of a conventional keyboard, graphic images, textual elements, user-defined elements, and the like. The design language can also provide for automatically adjusting size, shape, color, and location, of various input mechanisms (e.g., keys, selectors, icons, etc.)

The design language can provide for dynamically adjusting actions and input mechanisms based on any number of factors including for example any combination of one or more of user input, user action, display context, environment, or device orientation. The design language may also offer a range of natural language processing services and capabilities. In some implementations, the design language can be configured to receive information through user input using any combination of one or more interaction mechanisms including textual, audial, visual (images or video).

The design language may also be configured to provide automatic learning capabilities. For example, the design language can be used to continuously and dynamically evaluate a range of data and parameters associated with Apps or users to identify relevant information for the user. In one example the design language can evaluate data and/or parameters based on definitions of one or more rules associated with an application or a user.

During processing activities, the design language can be used to examine any number of items. For example, the design language can analyze things that a user indicates in an application or work that is pending within the user's role. The design language can be used to develop any number of contextual understandings, references, or other information discernable from a user or application. The design language can access processing activities to incorporate and/or leverage any number of pieces of data including biometric information (e.g., from a wearable device), location information (e.g., from a Global Positioning System (GPS) or a Location-Based Services (LBS) facility), just to name a few examples.

The design language can be used to automatically generate any number of artifacts (e.g., aspects pertaining to events, calendar items, notifications, alerts, etc.) based on user input, actions, or other input received in an application. The design language can be used to continuously adjust aspects of a note, including, for example, any display, entry, selection, command and/or controls that may be offered or displayed, to dynamically adapt to user input and/or actions.

Figure 4A:
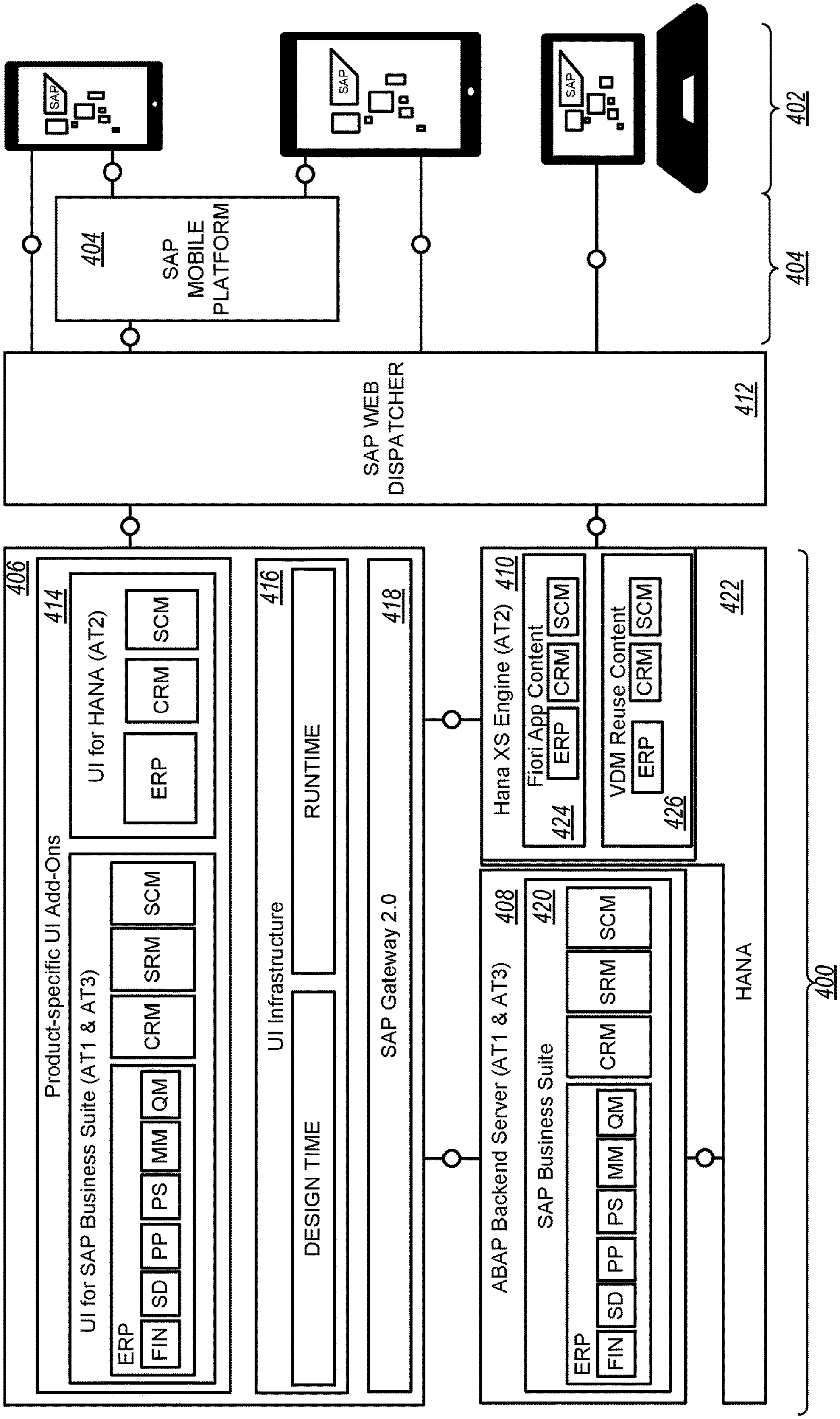
FIGS. 4A-4B depict aspects of an exemplary architecture for generating and modifying software applications.

Referring to FIG. 4A, an example architecture 400 is shown that can be used with the design language described herein. The architecture 400 may be utilized by any number of devices 402 via a mobile platform 404. The mobile platform 404 is a mobile enterprise application platform designed to simplify the task of creating applications that connect business data to mobile devices for workflow management and back-office integration. The platform 404 can function to provide a layer of middleware between heterogeneous back-end data sources, such as relational databases, enterprise applications and files, and the mobile devices that can read and write back-end data. In general, application developers write business logic of a mobile application using the development tools (i.e., the design language described herein). The design language can automatically translate data to create customized versions of a new application for a wide variety of mobile devices and operating systems. The design language can make it easier and faster than standard development principals to create complex applications that use multiple data sources and will work on many different mobile devices.

The architecture 400 includes a front end server 406, a backend server 408, a database engine 410, and a web dispatcher 412. The web dispatcher 412 represents a first point of contact in FIORI architecture for end users. The web dispatcher 412 handles all web browser requests from end users via mobile devices 402. The web dispatcher 412 is an entry point for all HTTP/HTTPS requests and defines whether a system has to accept or reject the requests and defines the server in which the requests may be directed. The web dispatcher 412 can reject or accept connection to a FIORI system.

The frontend server 406 can include product specific UI Add-On Applications 414 and a UI infrastructure 416. The UI infrastructure 416 can include a design portion and a runtime portion. The frontend server 406 can decouple a lifecycle of a UI (e.g., design and runtime deployment) from the backend server 408. The decoupling can allow UI applications to interface with a plurality of different databases. The decoupling provides a single point of UI design, access, and maintenance allowing for theming, branding, configuring, and personalizing a UI without a need for development privileges to the backend server 408 (e.g., no need to have backend administrative rights). The decoupling can result in a more secure enterprise computing system. The decoupling can provide for rule-based dispatching of requests in a multi-system landscape (e.g., for approvals including aggregation).

The frontend server 406 includes a gateway 418. The gateway 418 can provide a way to connect devices, environments, and platforms to enterprise software based on market standards. The gateway 418 can enable the development of UIs for use in different environments (e.g., social and collaboration environments). The gateway 418 can enable the development of UIs for use on different types of client computing devices. The gateway 418 can enable the development of UIs for use in internet-based applications.

The backend server 408 can include a bundle (a set) of business applications (e.g., business suite 420). The business applications can be transactional applications, analytical applications, and fact sheet and contextual navigation applications. Transactional applications can allow task-based access to tasks that can include create and change. In addition or in the alternative, transactional applications can allow access to entire processes with guided navigation. Analytical applications can provide a user with a visual overview of complex tasks for monitoring and tracking purposes. Fact sheet applications and contextual navigation applications involve search and explore activities. Fact sheet applications and contextual navigation can allow a user to view essential information about an object and can allow contextual navigation between related objects.

In general navigation in SAP FIORI for iOS® follows standard native navigation paradigms for particular operating systems and/or hardware platforms. When a user navigates to a new screen, the user's system default navigation is in place. The user starts from the home screen and navigates forward into the apps through multiple screens. The ubiquitous back navigation function allows the user to go back to the previous screen. Forward navigation to other screens of the app or other apps is triggered by links, line items, buttons, or other UI elements. No distinction is made between navigation targets that are technically within the same app and those that go to another app. Tapping on a line item can either trigger direct navigation or open a quick overview. In the quick overview, further navigation targets can be reached. This behavior may be consistent within an app. For example, line items in one table either open quick views or navigate to another page. The user can navigate back to the previous page with the back button in the upper left-hand corner of the app. Within quick overviews, it is possible to navigate to the quick overview of another object. In this case, the quick overview gets a back button to navigate back to the first object. All other links lead to new pages and close the quick overview.

The database management computing system 410 includes a database management server that can run (execute) applications that can manage a database 422. For example, the database 422 can be an in-memory, column-oriented, relational database (e.g., SAP HANA®). The database management computing system 410 can include extended application services that can embed a full featured application server, web server, and development environment within the database management computing system 410. The extended application services can include application content 424 and reuse content 426 for use by the enterprise computing system 402 when providing a personalized, responsive, and simple UX across different types of computing devices and deployment options.

Figure 4B:
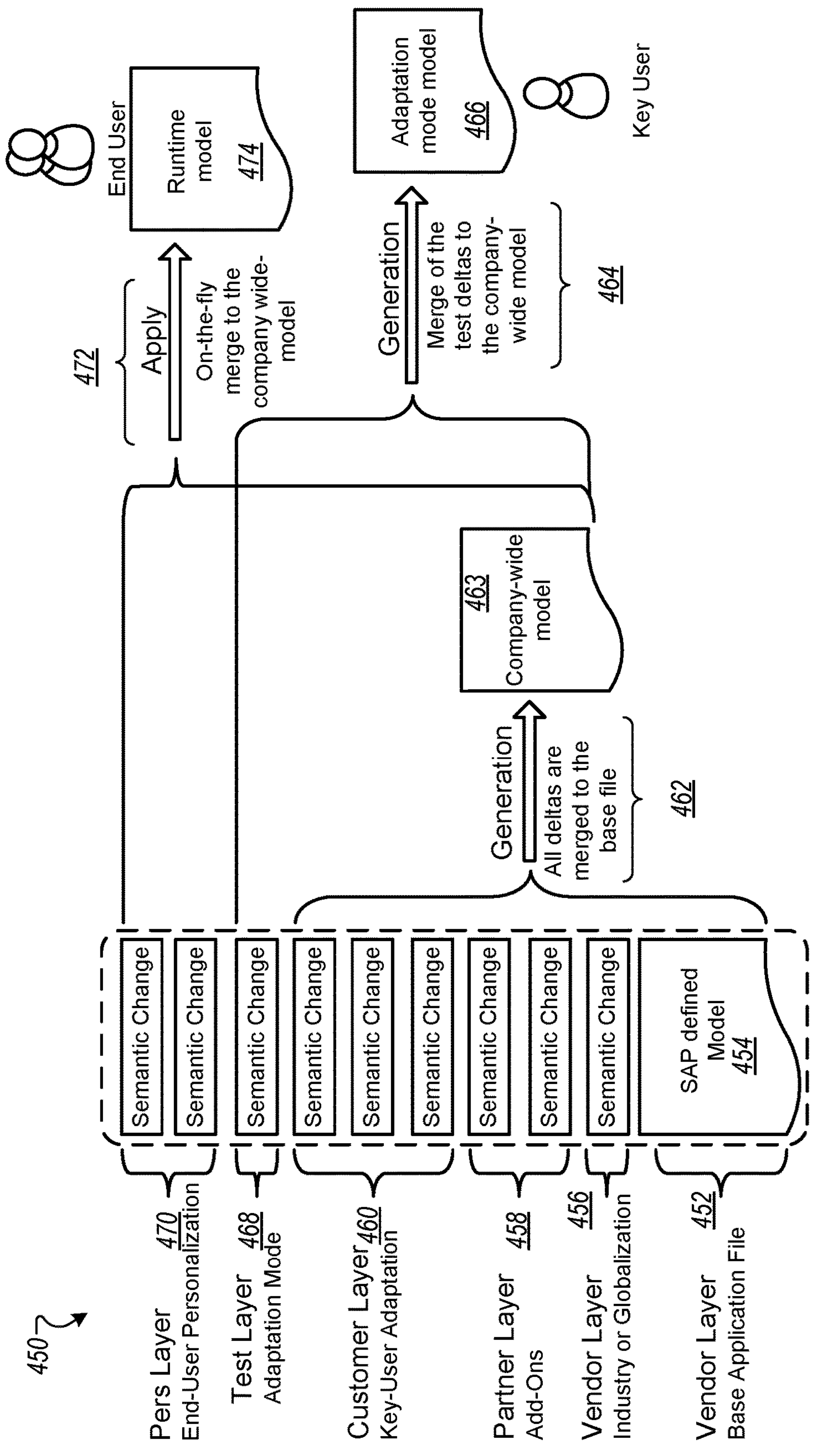

FIG. 4B depicts aspects of a layering architecture 450 that may optionally be employed to carry out changes, modifications, and/or personalization for portions of an application. The layering architecture 450 may be facilitated, in a hierarchical or layered approach, without having to alter underlying source code for particular applications. The architecture can be used to generate or modify an application.

The layering architecture 450 begins at a vendor layer 452 with a base application file to select a particular model 454. Next, a vendor layer 456 pertaining to industry or globalization can be selected. Semantic changes that occur based on the vendor layer 456 can be applied to the model 454. Next, a partner layer 458 pertaining to the addition of add-ons for a particular application and any semantic changes resulting from the partner layer can be applied to the model 454. A customer layer 460 pertaining to key-user adaptation can be executed and any semantic changes resulting from the customer layer can be applied to the model 454. Upon completion of the customer layer architecture level, differences or conflicts in the application caused by any semantic change thus far can be merged 462 into a base file and a company-wide model 463 can be generated.

Upon completion of generating the company-wide model 463, a test layer 468 pertaining to an adaptation mode can be implemented. Upon testing completion, an adaptation mode 466 can be generated by merging testing differences or conflicts to the company-wide model. Next, an end-user personalization layer (Pers Layer) 470 can be implemented and any semantic changes caused by executing such a layer can be applied 472 on the fly to the company wide-model to obtain a runtime model 474 that the end user can execute.

Figure 5:
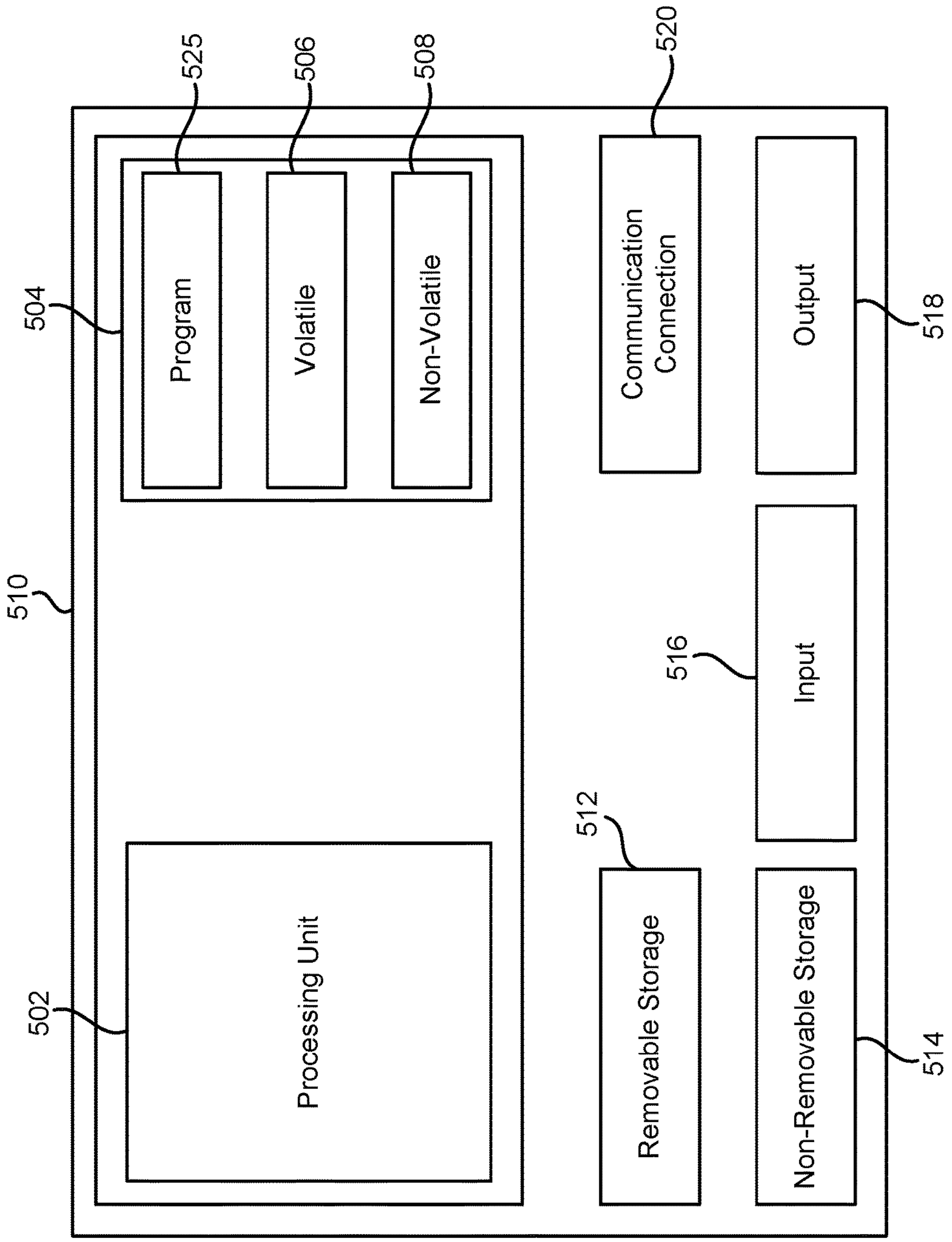
FIG. 5 is a block diagram of a computing device, according to an example embodiment.

FIG. 5 presents a block diagram of a computing device according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smart phone, a tablet, smart watch, or other computing device including the same or similar elements as illustrated and described with regard to FIG. 5. Devices such as smart phones, tablets, and smart watches are generally collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes RAM, ROM, Erasable Programmable Read-Only Memory (EPROM) and Electrically Erasable Programmable Read-Only Memory (EEPROM), flash memory or other memory technologies, Compact Disc Read-Only Memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a Personal Computer (PC), server, router, network PC, a peer device or other common network node, or the like. The communication connection 520 may be a network interface device such as one or both of an Ethernet card and a wireless card or circuit that may be connected to a network. The network may include one or more of a LAN, a WAN, the Internet, and other networks. In some embodiments, the communication connection 520 may also or alternatively include a transceiver device, such as a Bluetooth device that enables the computer 510 to wirelessly receive data from and transmit data to other Bluetooth devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

Figure 6A:
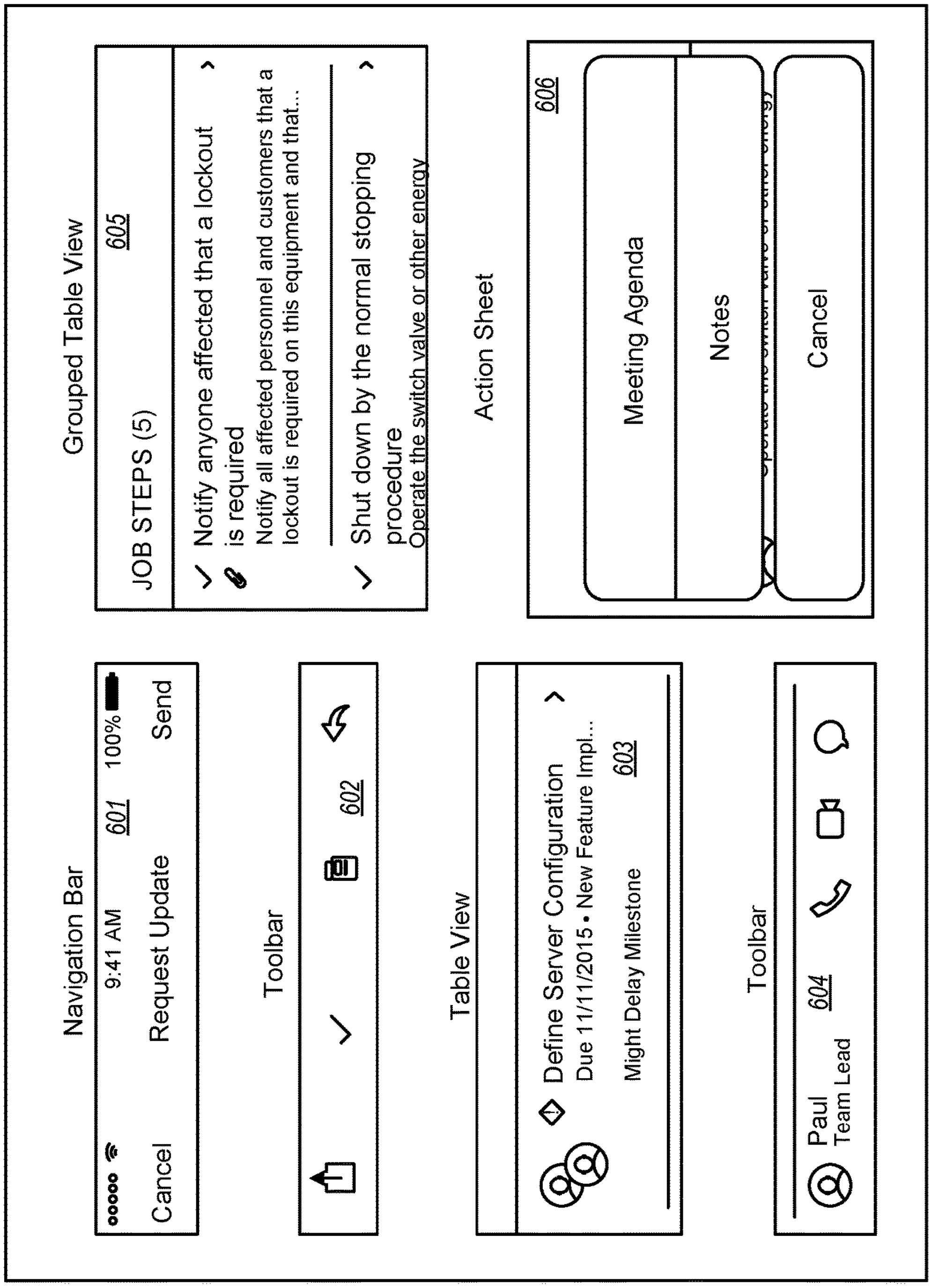
FIGS. 6A-6P depict example aspects for illustrative design language elements.
Figure 6B:
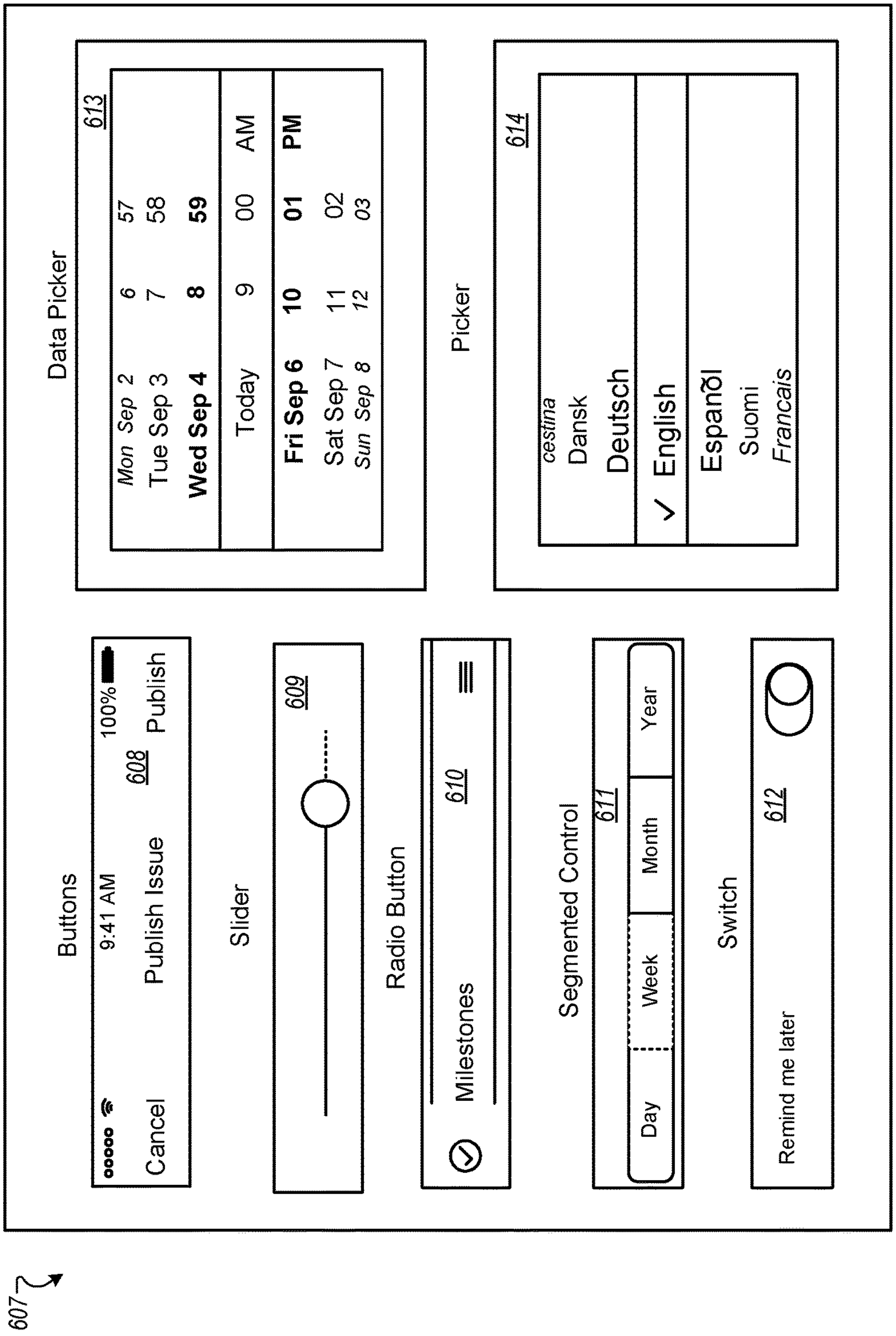
Figure 6C:
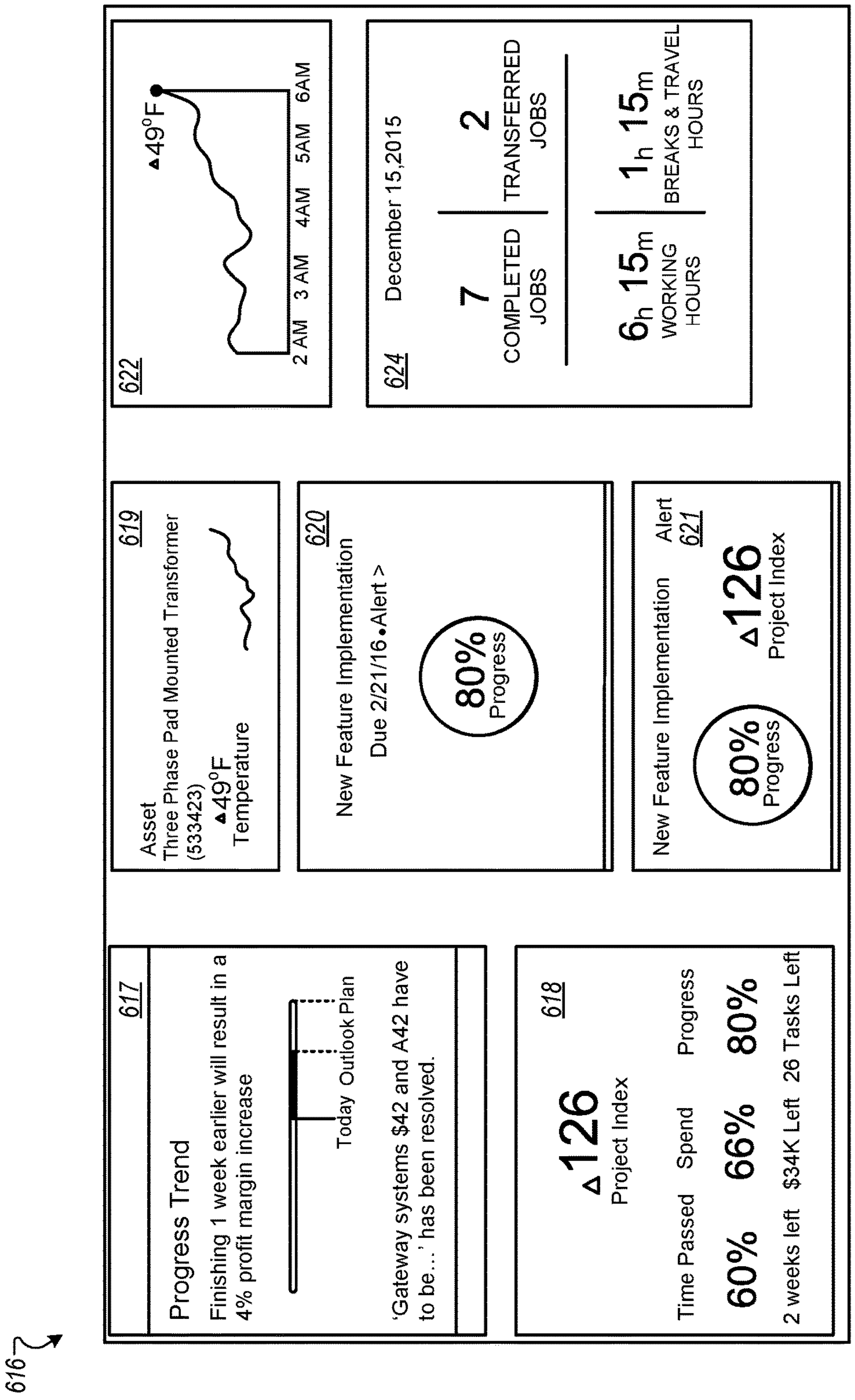
Figure 6D:
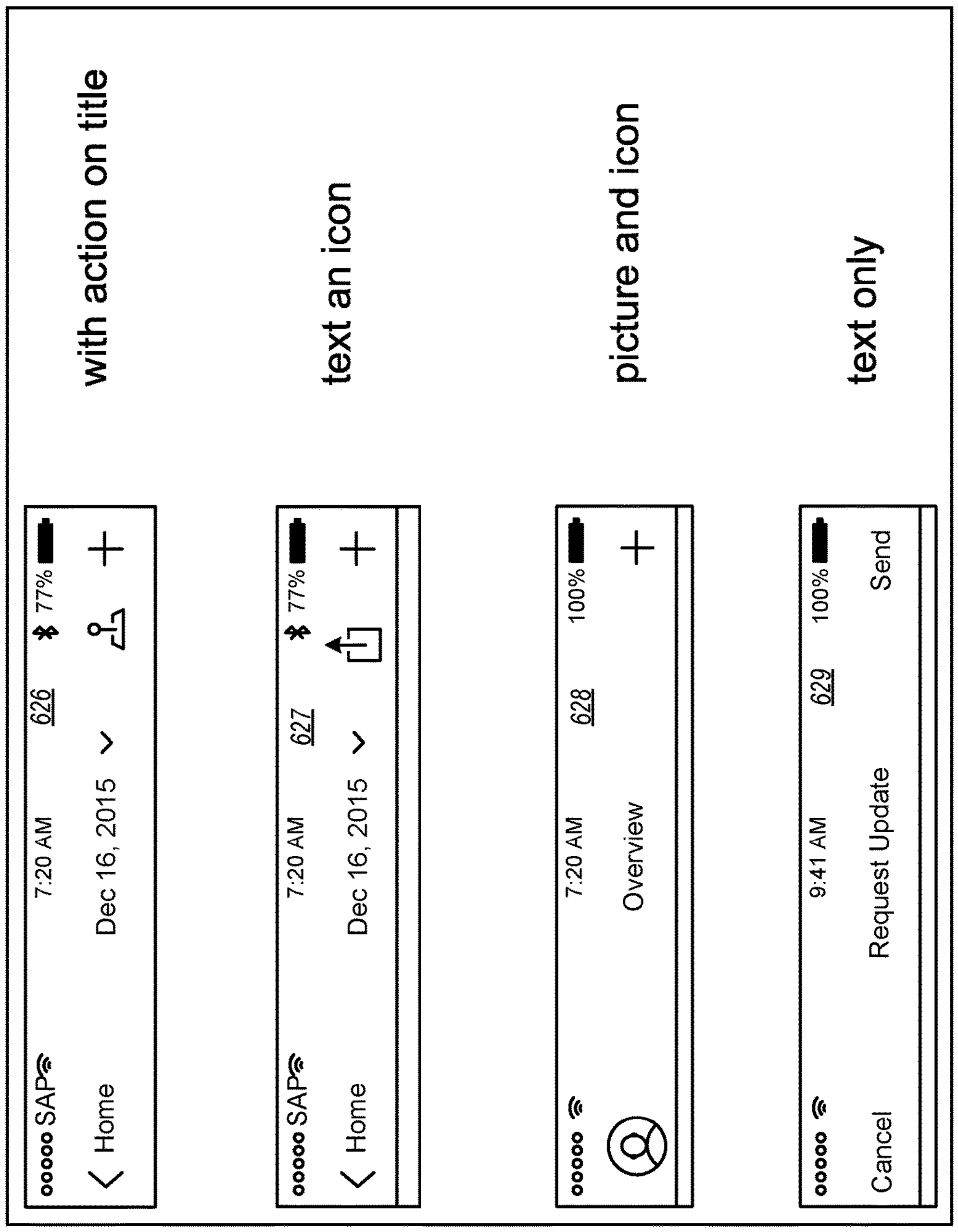
Figure 6E:
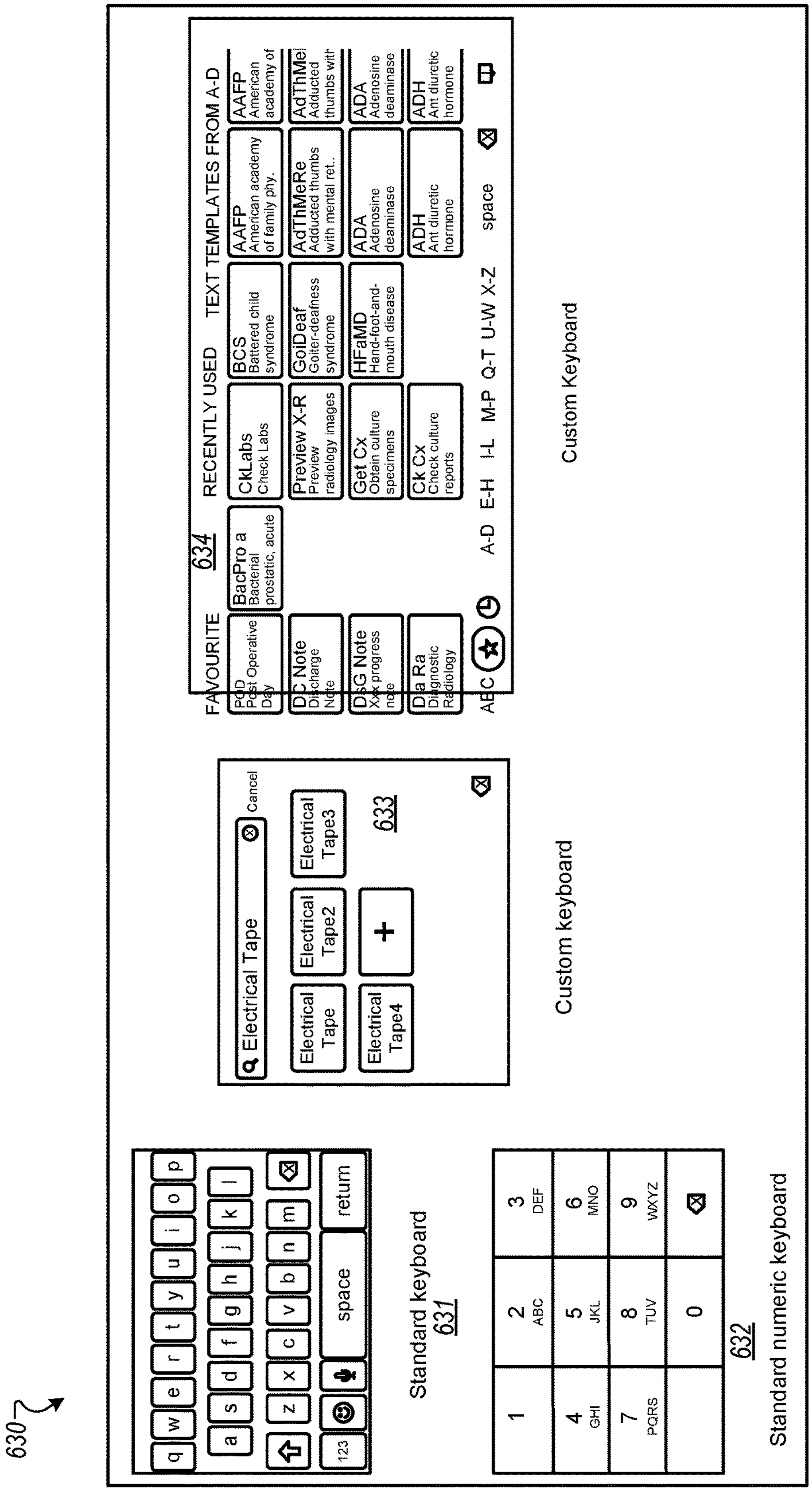
Figure 6F:
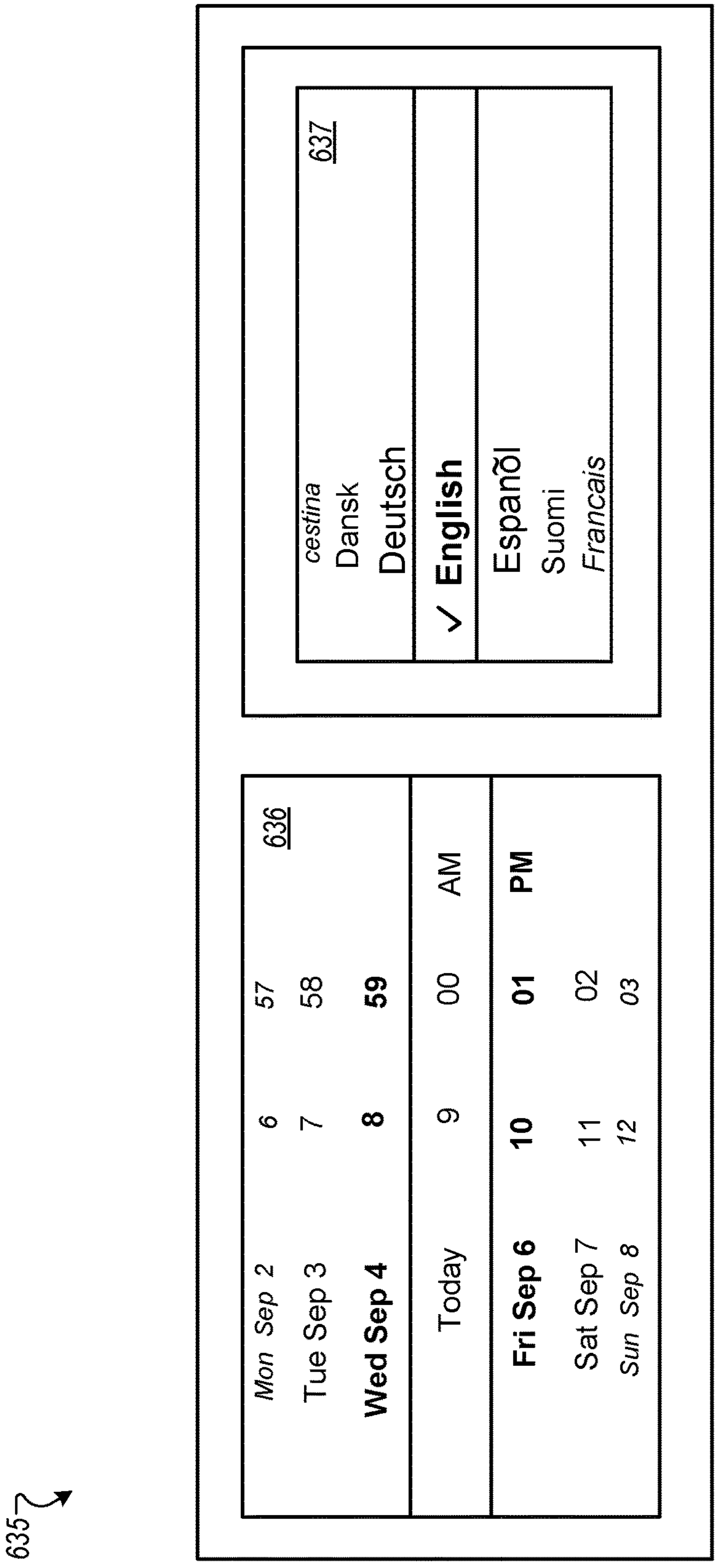
Figure 6G:
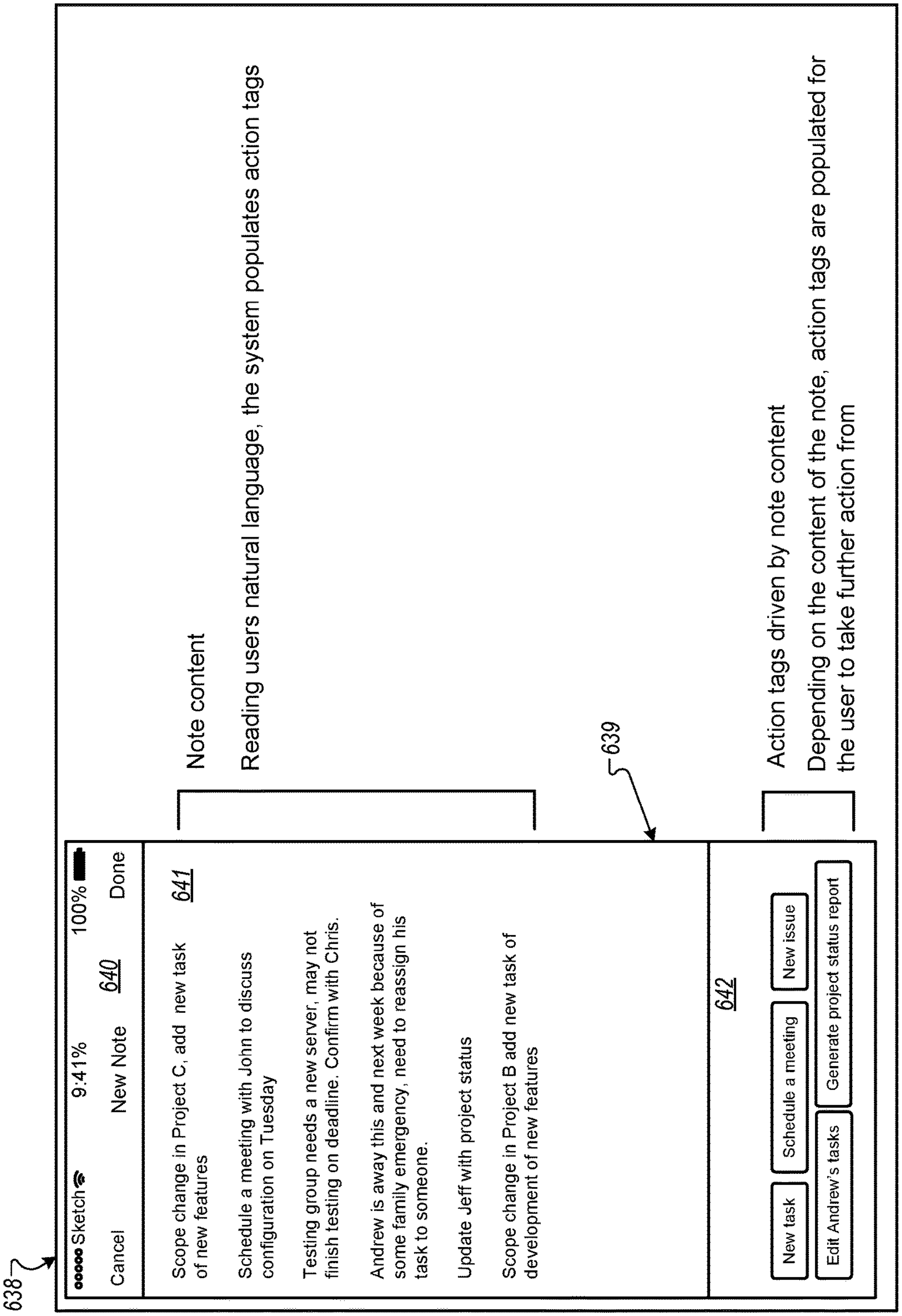
Figure 6H:
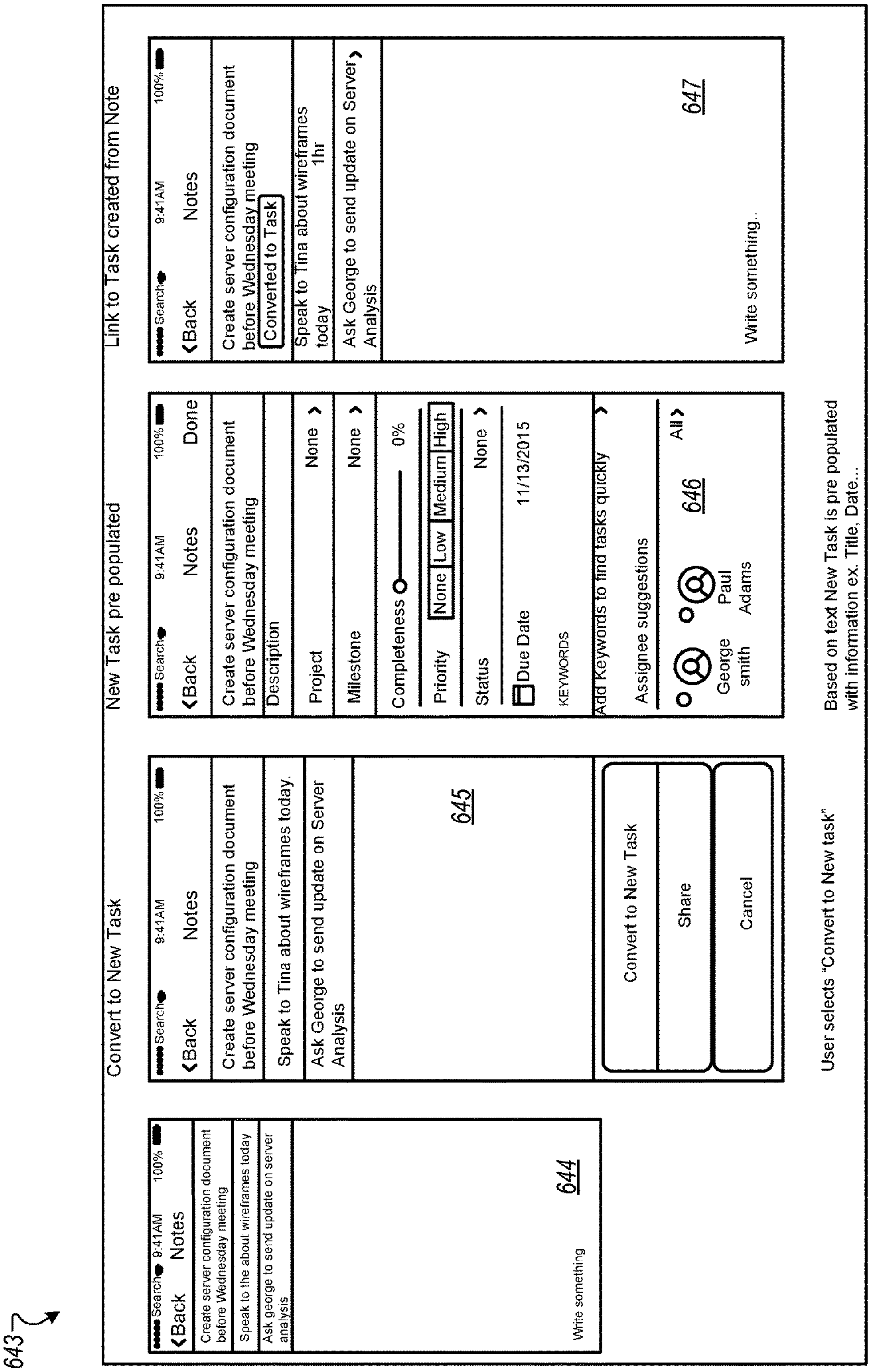
Figure 6I:
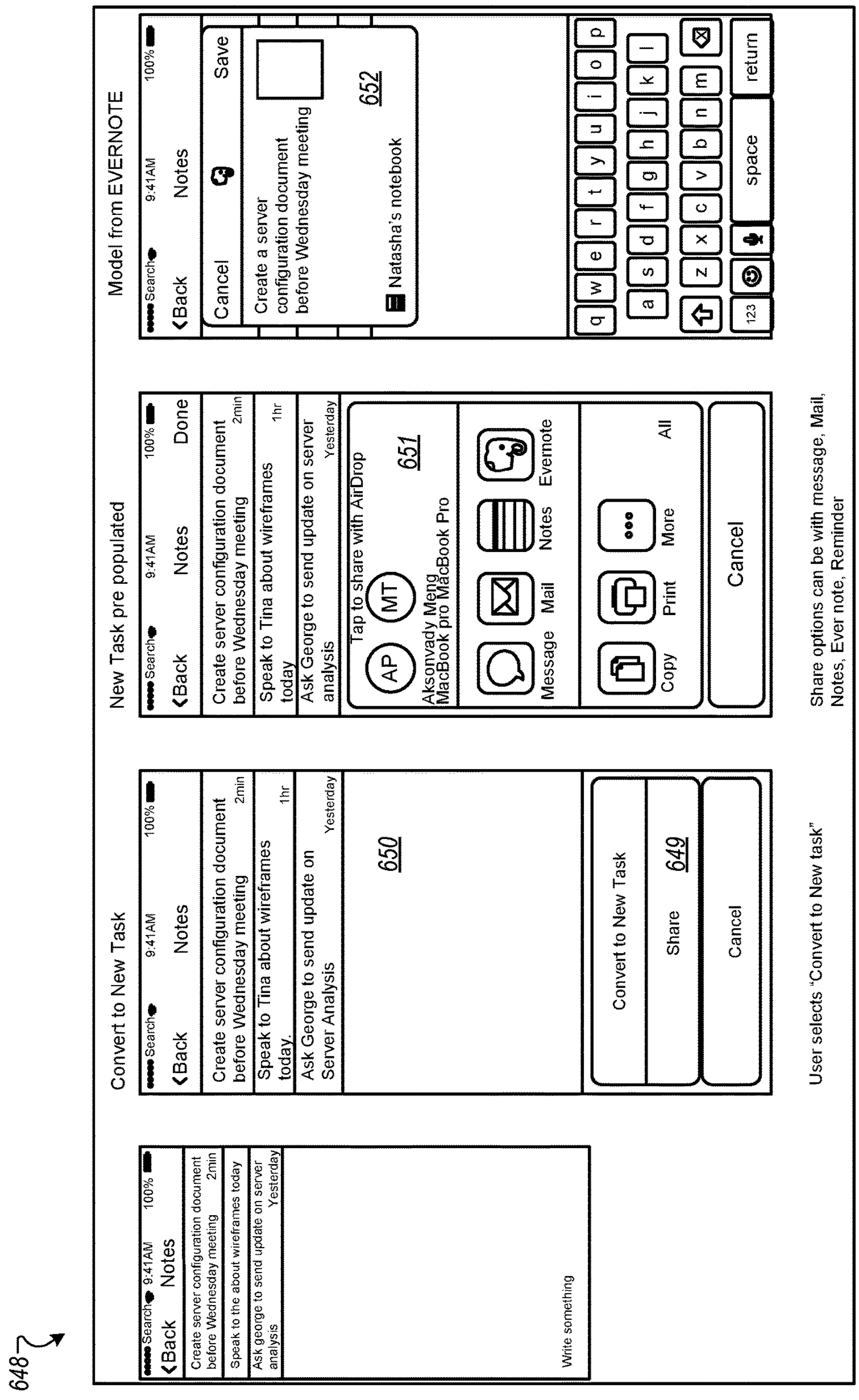
Figure 6J:
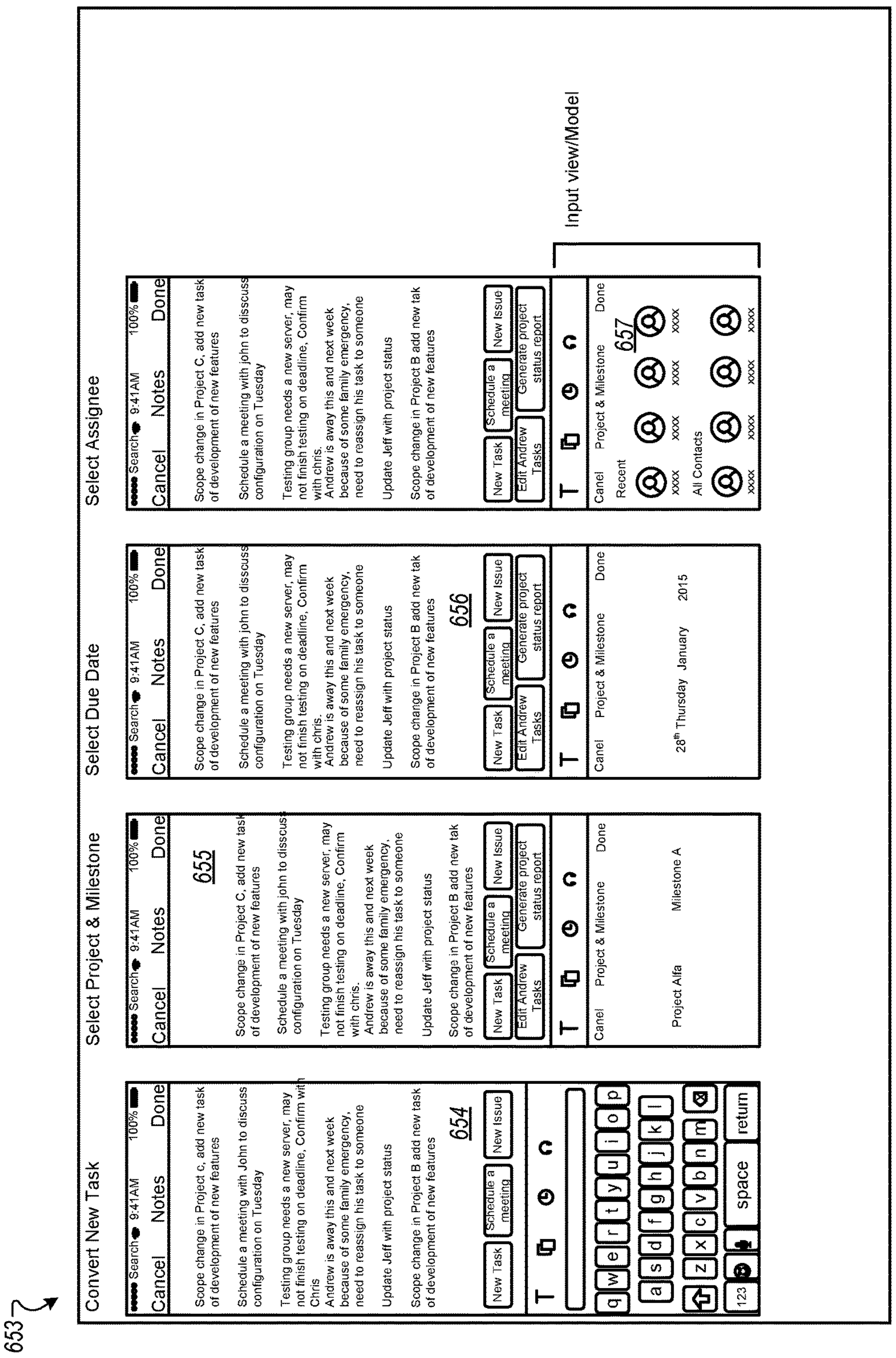
Figure 6K:
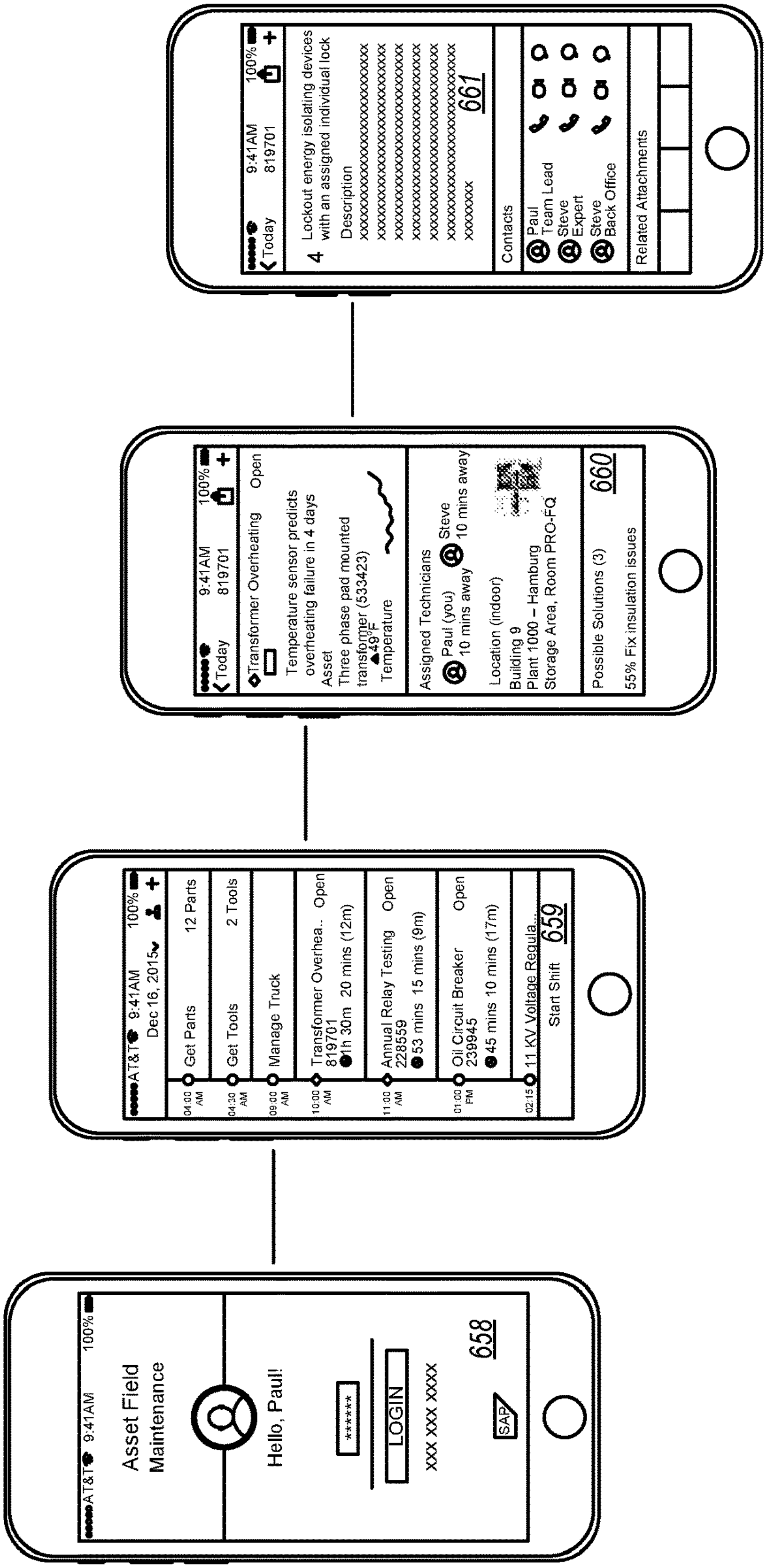
Figure 6L:
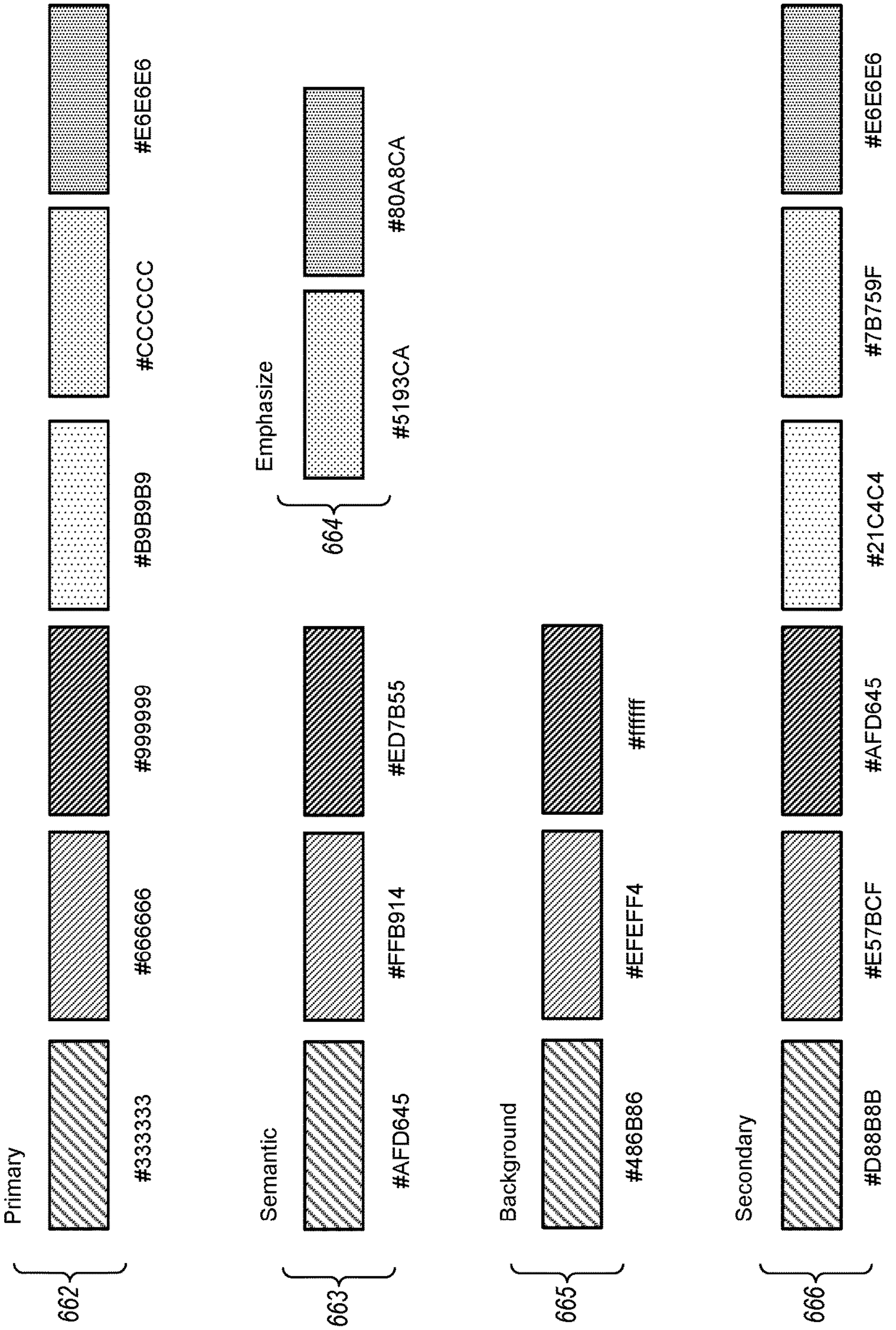
Figure 6M:
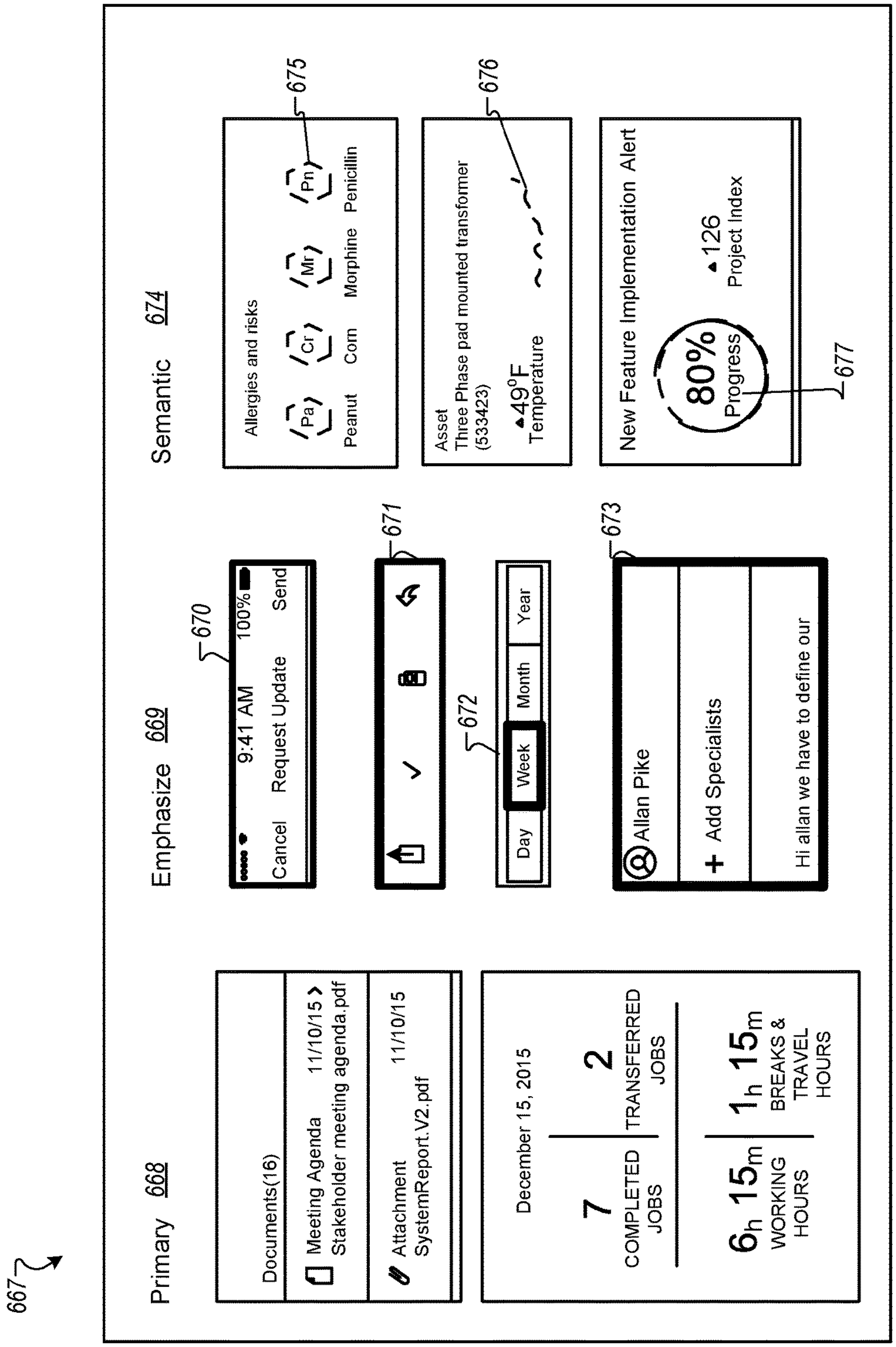
Figure 6N:
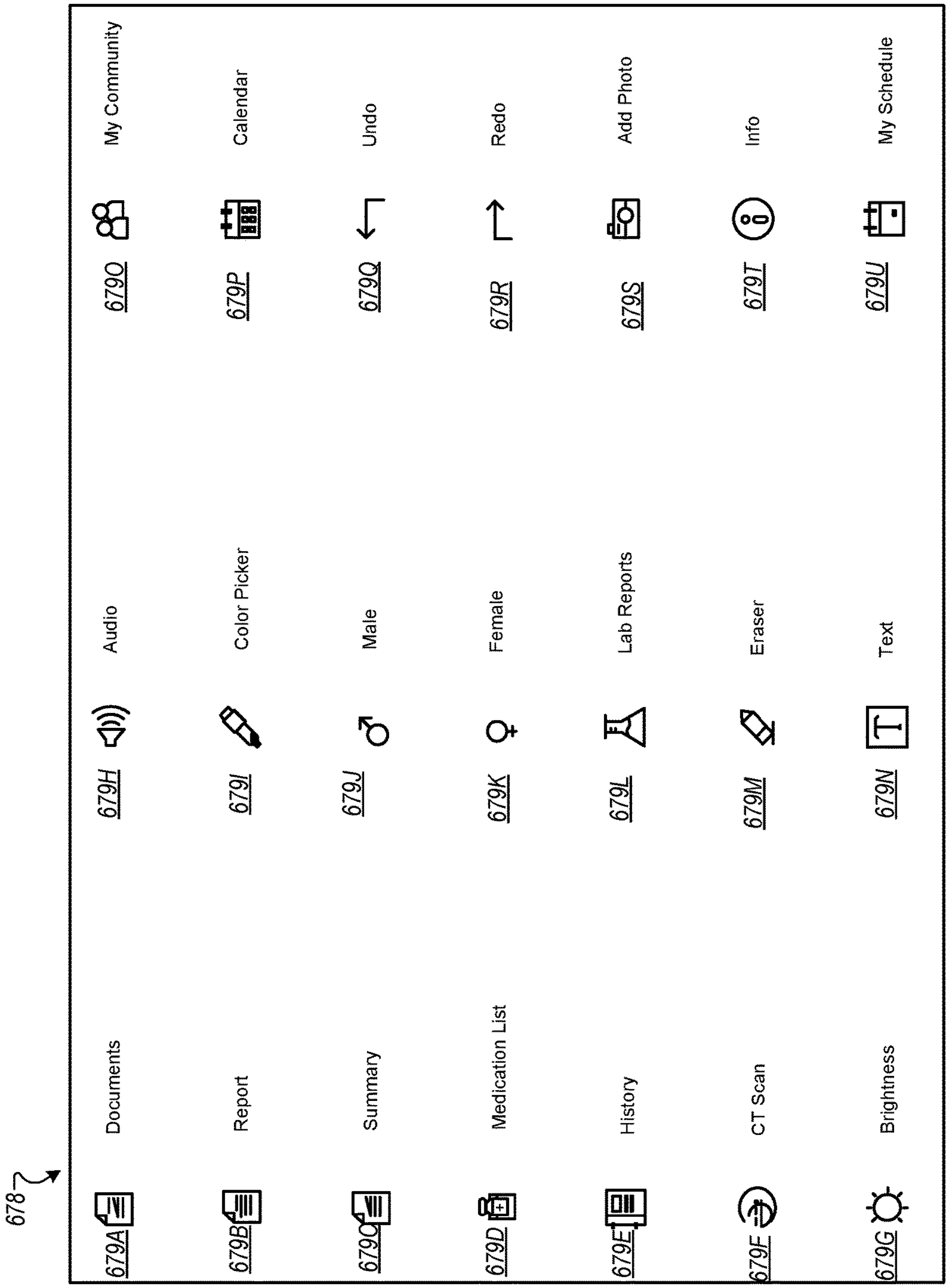
Figure 6O:
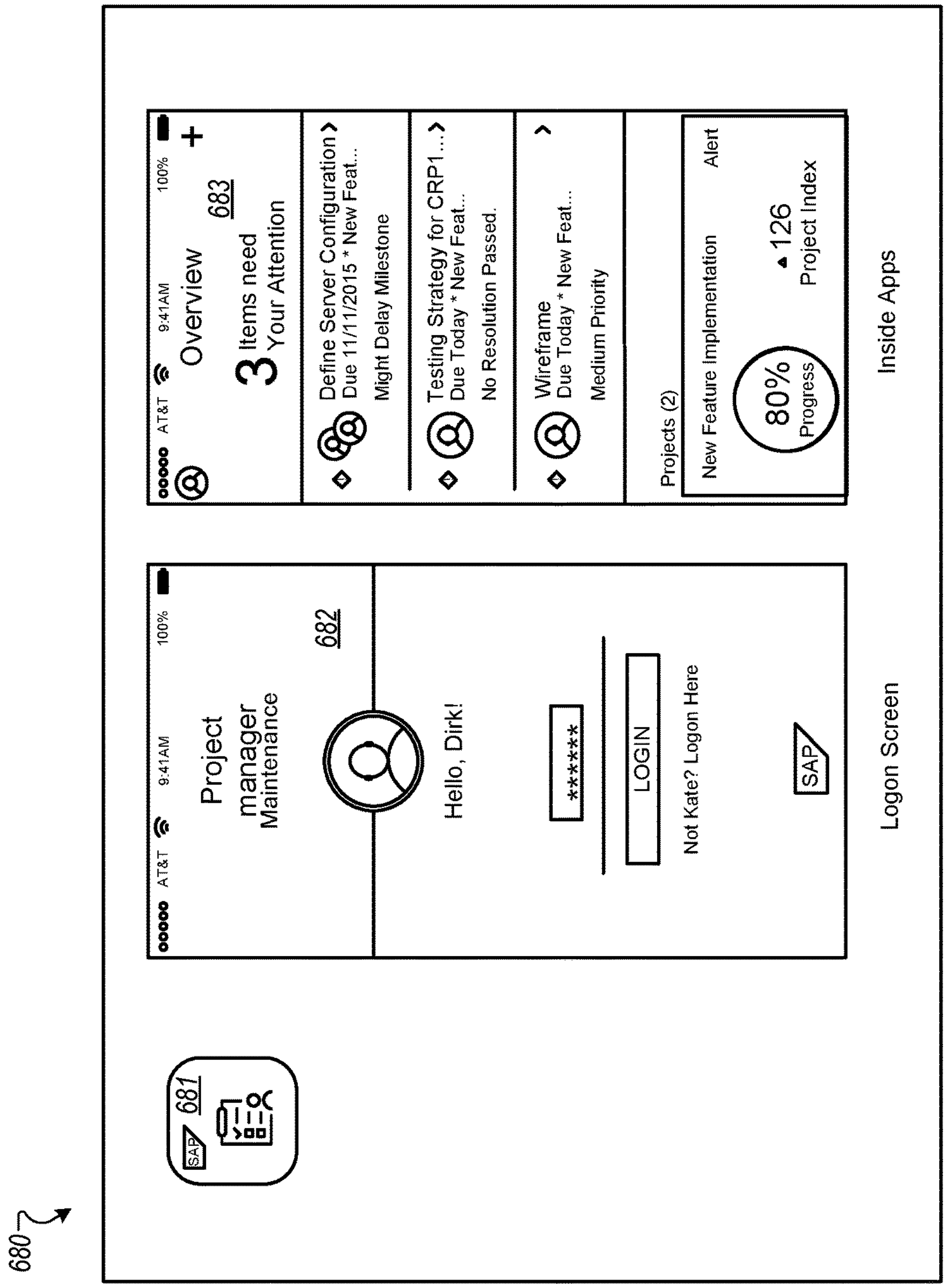
Figure 6P:
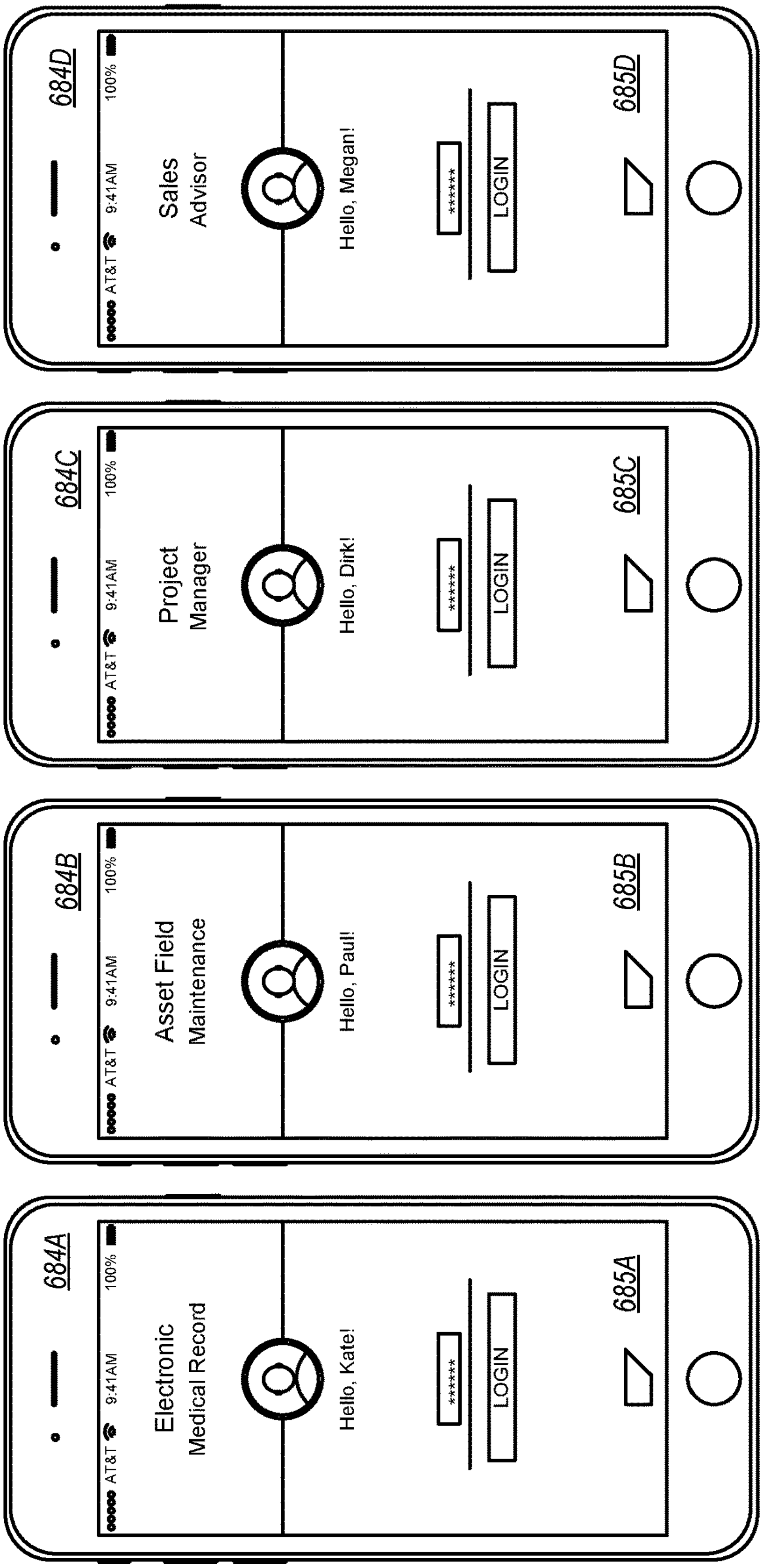

FIGS. 6A-6P depict screenshots of a user interface of selectable patterns (e.g., templates) used to generate functional application user interfaces. Each template can be selected by a developer for use in generating application UIs tailored to specific users and/or devices. The patterns (e.g., templates) may be accessible from the application design module 242, for example. The application design module 242 may leverage and employ various UI controls, layouts, and floor plans to yield various definitional materials including for example metadata and configurations. In operation, the application design module may be employed to define an application using a design language. Using a definition and optionally a number of supporting elements such as libraries and/or building blocks (e.g., templates, patterns, etc.), the application construction module 252 may generate an application. The application deployment module 262 can output applications for download by users.

In one example, the application design module 242 can provide a number of patterns (e.g., templates) to a user/developer. The templates may be standard or customized, and can include any application functionality that can be shown in a user interface. In some implementations, a user/developer may define customized content and patterns (e.g., templates) for use (and reuse). The customized content and templates may be generated such that a particular brand (e.g., brand identify, trademarks, etc.) can be preserved in each selectable content or template. For example, the developer may wish to preserve brand identity in a user interface and may do so by integrating functionality with look and feel design of the interface.

In some implementations, the templates may include standard patterns of selectable content that may be provided by an operating system. For example, FIG. 6A depicts a navigation bar template 601, a toolbar template 602, a table view template 603, a toolbar template 604, a grouped table view template 605, and an action sheet template 606. Each template shown in FIG. 6A may be selected for integration into an application. The template can generate functionality and interface componentry to be used within an application developed for FIORI or a customer selected application.

For example, the navigation bar template 601 may be for an application operating on a Wi-Fi enabled device. The Wi-Fi signal and battery readout are included along with links to cancel and send request updates. Similarly, a toolbar template 602 is shown with a send icon, a marked complete icon, and other icons that may be selectable when integrating a toolbar into an application generated by the systems and methods described herein. In addition, the table view template 603, the toolbar template 604, the grouped table view 605, and the action sheet 606 can provide other optional add-in functionality upon being selected to be added to a particular application.

FIG. 6B depicts a screenshot 607 of a user interface of selectable patterns (e.g., templates) used to generate functional application user interfaces. For example, screenshot 607 includes a buttons template 608, a slider template 609, a radio button template 610, a segmented control template 611, a switch template 612, a data picker template 613, and a picker template 614. The buttons template 608 may include any number of graphical buttons that provide one or more application functions. A cancel button, a publish issue, and a publish button are examples shown in FIG. 6B. Similarly, any number of slider bar templates 609, radio button templates 610, segmented control templates 611, switch templates 612, and picker templates 613 or 614 can be selected for inclusion in an application user interface. In addition, each template 608-614 can provide other optional add-in functionality upon being selected to be added to a particular application.

FIG. 6C depicts a screenshot 616 of a user interface of selectable patterns (e.g., templates) used to generate functional application user interfaces. For example, screenshot 616 includes a progress trend template 617, a summary template 618, a combination graph data template 619, a progress template 620, a progress alert template 621, a graphical template 622, and a summary template 624. Each template 617-624 can provide other optional add-in functionality upon being selected to be added to a particular application.

FIG. 6D depicts a screenshot 625 of a user interface of selectable patterns (e.g., templates) used to generate functional application user interfaces. For example, screenshot 625 includes a number of templates 626-629 that can be added to application UIs. Example template 626 can include an action on the title bar. Example 627 can include text and icons on the title bar. Example 628 can include pictures and icons on the title bar. Example 629 can include text only on the title bar. Each template 626-629 can provide other optional add-in functionality upon being selected to be added to a particular application.

FIG. 6E depicts a screenshot 630 of a user interface of selectable patterns (e.g., templates) used to generate functional application user interfaces. For example, screenshot 630 includes a standard keyboard template 631 and a standard numeric keyboard template 632. In addition, screenshot 630 includes a custom keyboard template 633 and another example custom keyboard template 634. Each template 630-634 can provide other optional add-in functionality upon being selected to be added to a particular application.

FIG. 6F depicts a screenshot 635 of a user interface of selectable patterns (e.g., templates) used to generate functional application user interfaces. For example, screenshot 635 includes a data picker (e.g., selector) template 636 and a selector template 637. The data picker template 636 may represent an enhanced data and/or value selection mechanism. Each template 636 and 637 can provide other optional add-in functionality upon being selected to be added to a particular application.

FIG. 6G depicts a screenshot 638 of a user interface of selectable patterns (e.g., templates) used to generate functional application user interfaces. For example, screenshot 638 includes a mobile device 639 in which a developer has generated an application that includes a template 640, a note area template 641, and an action tag template area 642. The note area template 641 may be programmed to provide a notes entry area for an end user to input text and graph content. The notes entered by the user can populate content in the action tag template area 642. For example, a developer can provide a template in a user interface of an application that can be populated at a future time with tags driven by the notes entered by an end user. The action tag template may provide populated content for a user to take further action from. For example, upon populating an action tag using note data, the user interface may place functionality within the action tag that, when selected by the end user, navigates the user to a relevant area of the application (or another application). Each template 640, 641, and 642 can provide other optional add-in functionality upon being selected to be added to a particular application.

FIG. 6H depicts a screenshot 648 of a user interface of a progression of using implemented patterns (e.g., templates) in a generated functional application. For example, screenshot 643 includes a mobile device user interface in which a user has provided notes at template 644. At template 645, the user is provided options to take action on such notes. For example, template 645 provides a way to convert to a new task, share, or cancel particular notes. If an end user were to select convert to new task, the application may be programmed to populate the new task in another user interface on the mobile device, as shown at template 646. Additional functionality may be provided based on a developer selecting to add the new task template. For example, the developer may select additional functionality for the assign new task template such as suggesting assignees for particular tasks. Upon completing the assign new task dictated by the template functionality, the mobile device may provide a link of the converted task, as shown in template 647. The templates shown in screenshot 643 can provide other optional add-in functionality upon being selected to be added to a particular application.

FIG. 6I depicts a screenshot 648 of a user interface of a progression of using implemented patterns (e.g., templates) in a generated functional application. For example, screenshot 648 is similar to screenshot 643 in that similar functionality is provided. However, in this example, instead of convert to new task, an end user may select the share button 649 on template 650. The share button may be part of a template that provides an interface/template 651 to enable the user to share content/notes, etc. Example share options in template 651 may include sharing via message, mail, notes, EVERNOTE, reminders, etc. In some implementations, the template 651 may be tailored to a particular operating system, user role, and/or device. Once the user has selected to share, an example dialog 652 from an installed application (e.g., EVERNOTE) can be populated by the systems and methods described herein. The dialog 652 may not be preconfigured and may instead use exiting infrastructure in which to populate new content obtained from user input. Particular dialogs can maintain a look and feel of the base application program indicated to provide the dialog, but can include information and additional template content generated using FIORI controls and templates.

FIG. 6J depicts a screenshot 653 of a user interface of a progression of using implemented patterns (e.g., templates) in a generated functional application. Here, an end user may have selected a new task action tag in interface 654, and may be provided a model/input view (based on a functionality in a new task action template). Here, the user has the option of typing in the task name or copying from the note above.

As shown in interface 655, the selected on the next tab on model to input details including the Project and Milestone the task belongs to. The user also may input an assigned user for the talks and a due date for the task, as shown at interface 656. The user may be provided an option of opting out of the action at a time by clicking cancel. The user can decide to complete creation of the task by clicking on done at any time after inputting task content, as shown at interface 657. Using an input view, the user can input key information regarding any entity provided. This view may differ for every other entity. In general, FIGS. 6G-6J depict examples of a smart note facility in which available or displayed controls may dynamically adjust and/or respond to user entries, actions, etc.

In some implementations, a create view tool/template is used to generate new objects and object details, and is presented to the user via a modal view. In order to create a new object or object detail, the user can enter at least one data point. The following guidelines explain how to use the controls within create view for a variety of data types. Data entry components within the create view template are grouped by their data type.

Key information is made up of the mandatory data used to create a new object. This may appear at the top of each screen (e.g., the title for a New Task). In some cases, key information may be pre-populated, and the user may or may not have the ability to edit these details. Depending on the use case, the information that appears within the key information section will be different. For example, if a user creates a new note, the key information section may be presented as a text view.

New objects may be based on an object floorplan. The object floorplan is a collection of attributes surrounding one particular business object. The object floorplan includes a header area, a content area, and an optional footer area, each made up of vertically-stacked sections. In some examples, users are able to drill down into specific attributes within the object floorplan. The object floorplan may be used in the middle of a workflow to show a leading object that has multiple attributes. Objects can be accessed from an overview, a work list, a list report, or a related business object. To present more information about one specific attribute of an object, use the object details floorplan, which can be accessed via drill down from the object screen.

The object floorplan may be represented as a full-screen floorplan that includes the following areas in sequence: a header area, a content area, and an optional footer area. All areas may be vertically-stacked together. The object floorplan follows a tasked-based content hierarchy designed to improve a user's ability to complete the job at hand. In this task-based content hierarchy, none of the sections or section groups are mandatory, but when they appear, they generally follow the suggested sequence.

A header represents the leading content section of an object floorplan. It provides a quick view of the most important information about the intended business object. As the first section, the header is typically located in the header area to capture the user's attention.

A contextual section provides supplemental information about an object in addition to what is shown in the header. It gives the user a comprehensive understanding of the task at hand.

An instructional section aims to help the user efficiently complete the current task. Content sections are prioritized based on the current scenario to maximize the user's ability to complete the job.

A referential content section provides relevant information around an object. Content sections may be arranged by frequency of use. The placement of sections is based on their level of priority and their frequency of use relative to the user's intended task. Based on the actual business scenario, however, this suggested placement can be overridden. For instance, sections can move up to more prominent locations if they fulfill the priority rule or the frequency rule.

In general, there are three types of layout for object floorplan: a standard object layout, a profile layout, and a retail layout. The standard object layout uses an object header. Some examples of standard objects are work orders, tasks, issues, parts, etc. The profile layout is used for profile objects. This layout uses a profile header to display profile specific information and actions. The retail layout is used to display large images for the retail products and all the purchase options.

Object view supports both regular and compact views. Sections in the content area maintain the same vertical structure across views. Individual cells expand horizontally to fit the actual screen size. The header area may behave differently based on different header styles.

A split view floorplan may also be used. The split view floorplan is a full-screen layout containing two related panes of information. These are typically placed side-by-side in regular view or accessible via drill-down in compact view. A master pane contains a header area, a content area, and an optional footer area. In regular view, it is found on the left side of the screen; in compact view, it is the first screen presented to the user.

A details pane contains a header area and a content area, each made up of vertically-stacked sections. The details pane does not typically include a footer. In regular view, the details pane is found on the right side of the screen; in compact view, it is presented when a user has drilled-down from the master pane.

The split view is an efficient way to present object collections that are organized into multiple categories and sub-categories. Split view acts as a standalone floorplan within a workflow; the master pane contains a table with a list of categories or objects, and the details pane contains either a list of sub-categories, a list of objects, or object details, depending on where the user is in the information hierarchy. If the user wishes to display an additional level of detail for a particular object attribute, a detail details drill-down screen can be used.

The split view floorplan is a full-screen layout made up of two related panes. The information displayed in either pane's Content Area varies depending on how far the user has drilled-down into the content tree. The master pane may display a list of object categories, object sub-categories, or objects themselves. The details pane may display a list of sub-categories, a list of objects, or object details, depending on what has been selected in the master pane.

By default, items in the content area can be sorted based on type. For example, if knowing when an item was received is important to the user, items may be sorted by received time and date. Sorting options can be changed by the user within the filter menu.

Split view supports both regular and compact views. Sections in the Content Area maintain the same vertical structure across the two views, and individual cells expand horizontally to fit the actual screen size. In regular view, the two panes are located side-by-side, with the master pane on the left side and the details pane on the right. The master pane contains a header area, a content area, and an optional footer area. The details pane contains its own header area and a content area (there may be no footer in the details pane). There may be only one status bar, shared by both panes. In compact view, the master pane is the default view presented to the user, with the details pane accessed by drilling-down into a category or object. The toolbar is an optional component that can be used when filter, feedback, and/or actions are needed, and it will only appear in the master pane.

In order to navigate the content hierarchy, the user is able to drill down through list items. In regular view, drill-downs can only take place in one pane of the split view—either the master pane or the details pane, but not both. In compact view, drilling down is accomplished by pushing from one full screen to another.

A table view floorplan may also be employed. The table view is a building block of the FIORI for iOS® design language. It is a container for which information can be displayed in a single-column list, as opposed to a multi-column, grid-like arrangement a Collection View provides. Table Views are populated with Table View Cells, which include Object Cell, Contact Cell, and Label/Value Cell.

The Table View is used to present small to large amounts of information in the form of a list. The Table View is ideal for text-based content. Table views can be used with variations. For example, Table Views can be divided into sections or groups and stacked in a single-screen layout. They are commonly found in the Overview, Object, Object Details, List Report, and, Worklist Floorplans.

A Standard Table View variation is used to display a full list of content so a footer can not be used and the header is optional. As the page is scrolled, additional cells load and there may be no limit to the length of this content. The Standard variation is commonly found in the List Report, and, Worklist Floorplans.

A Preview Table View variation is used to display a preview of a list so both a header and footer may be used. It is recommended that no more than three content cells be displayed. The Preview variation is commonly found in the Overview, and, Object Floorplans.

Tapping on a single Table Cell that populates the Table View, with the exception of a Label/Value Cell, will navigate to a detailed view of the object. In most cases this will be an Object page. In the Preview variation, the "See More" label in the footer will navigate to the entire set of data, usually in the form of a List Report.

A work list floorplan may also be employed. The work list floorplan contains a table of grouped objects that belong to the same object type. These may be objects that go through a process or cycle during which their status or state changes. Typically, the system automatically clusters the objects into multiple groups, which can contain objects that are at the same stage in their lifecycle. As an example, for hospital instruments that need to be cleaned and packed, groupings could include instruments that are "Used," "Cleaned" and "Packed."

The work list floorplan is often accessed through the overview screen. Objects of the same type are grouped by status in their respective process or lifecycle, and as the users drills down further from the work list, they can access the list report, object, and object details. The work list floorplan is a full-page floorplan comprised of the following elements:

Header area—consists of a status bar, a navigation bar, and a table header. The table header gives information about the content area and displays feedback.

Content area—displayed as a table; it contains a list of objects grouped by their state or stage in a particular lifecycle (e.g. "to be cleaned", "cleaned", "sterilized", "packed", etc.). Objects are grouped automatically by the system and each group can have a title.

Footer area—for apps that use flat navigation, the footer appear as a tab bar; when an app is in edit mode or when it provides actions that apply to groups of items on screen, the footer would appear as a toolbar.

Work lists can contain a large amount of detailed information, and users may need to compare values between objects. To facilitate this, work lists can be displayed using a list view comprised of vertically-stacked objects. In regular view, consider designing for an additional column to display more information.

There may be a limit to the number of objects that can be displayed at once within each grouping section. If the number of objects exceeds this limit, users can tap "See all" to access the entire list for that grouping.

Work list supports both regular and compact views. Sections in the content area maintain the same vertical structure across views, and individual cells expand horizontally to fit the actual screen size. In compact view, the title of each item will truncate. In regular view, it may be possible to provide detailed descriptions for each item.

Moreover, based on its larger screen size, when designing for regular view, consider adding an additional column to the work list table if this would better support users without making the existing content crowded.

An overview floorplan may also be employed. The overview floorplan includes a header area and a content area. With some exceptions, it may also include a footer area. The header area may display numbers that demand the user's attention and provides quick access to these items. The content area contains multiple vertically-stacked content sections and provides users drill-down access to these objects. It also contains facets as a menu for the user to navigate through the app.

An optional footer area can contain either a toolbar or a tab bar, depending on the app's navigation style. With a hierarchical navigation style, the overview floorplan is normally used as an entry screen, and a toolbar can be used when there are actions that are applied globally to the app. In apps with a flat navigation style, a tab bar can be used to allow the user to switch between different sections of the app.

Within quick overviews, it is possible to navigate to the quick overview of another object. In this case, the quick overview gets a back button to navigate back to the first object. All other links lead to new pages and close the quick overview.

Property cells may be represented by any cells in a user interface that contain a label and a user-selectable value, such as a due date. The order of the cells in a section (and within groups in such a section) is based on the information hierarchy of the input fields.

An accessory area template may be placed last on a user interface, and may include elements such as switches, notes, and attachments. Each of these elements can be situated in its own grouping.

A text field template may be placed on a user interface and may be used for entering a small amount of information within a single-line, fixed-height field. For multi-line text entry, a text view template may be used instead of a text field template. Before content has been entered in a text field, there may be placeholder text in the text field to communicate its purpose (e.g., "Title," "Description," etc.). In some implementations, the content in text field templates can be pre-populated.

Picker templates may allow users to select date or time entries within create view. The date picker template can be used to specify a date, a time of day, or a combination of both. The default value of a date picker template may be the current date and time.

Drill down value list templates allow for the selection of one option among values within a defined category—for example, to choose a specific project when creating a new issue entry. Default values may be provided in value lists, and in some use cases, the default value may not be editable by users. For example, if a create modal is triggered from a task detail screen for the creation of an issue tied to the current task, the value of task may be pre-populated and not editable by the user. When the body text in a property cell is long, the cell body may be placed on a second line below the cell title. If the body content is still too long, it may be truncated.

A search function template can be included within a value list with a large amount of content. Values in the list can also be grouped if this would aid users in more quickly making selections. When a property cell template accepts multiple values, the selected values may be displayed below the cell title on a separate line. If this second line cannot display all the selected values, any text can be truncated to provide an indication of the number of hidden values (e.g., "Value 1, Value 2, Value 3, Value 4, and 3 more . . . ").

Button templates may be used within a property cell to present users with short text value selection options. These buttons are generally single-selection, and there may be up to three buttons in one cell. Switch templates may be used when a property has only two mutually-exclusive states—either on or off. In some use cases, when a switch is set to 'on,' additional data can be entered (e.g., via a date picker).

Text view templates allow for multiline text entry (for use cases such as entering notes). The height of the cell for text view is usually larger than a single cell to indicate to users the multiline usage. If there are additional accessories on screen below the text view section (such as Attachments), the height of text view cell may be fixed and a scroll bar may be applied to allow users to view the entire text. If the text view is the last section of a create view modal, the height of the cell can grow downwards as the user types content into the cell.

Attachment templates may be used to upload items such as photos and audio files. The "+" button will generally remain in the first position at the top-left, and uploaded files can be displayed after the "+" button as thumbnails in the order they were uploaded (with the most recent item at the upper left). Users can tap on the thumbnail of an attachment to preview it and from the preview screen, users can then take the "Delete" action. If an attachment can be previewed (e.g., a pdf or Word document), the preview can be presented within a drill down screen. If an attachment cannot be previewed, the user may be informed of this and provided with the ability to open the item using other apps.

In operation, a create view modal is usually triggered by tapping the "+" button on the navigation bar, which presents the user with the option of adding a new item to the current screen. If only a part of the on-screen content utilizes the 'add new item' function, the add new button can be placed in the section. The button may function to bring up a create view modal.

For create modals that include only text-based content areas, when the modal appears on screen, the keyboard may appear at the same time. However, if this would cause any of the content areas in the modal to be hidden, the keyboard may not automatically appear. Instead, the keyboard may slide into view with a particular modal dialog box.

FIG. 6K depicts a user interface progression of using implemented patterns (e.g., templates) in a generated functional application on a mobile device. Here, the user is provided an entry screen 658 because a developer selected an entry screen template to be generated for an example application accessible from the mobile device. As shown in interface 659, once the end user logs in, the template may be configured to provide logged data/schedule data for a project associated with the user or the role of the user. As shown in interface 660, the user selected a transformer overheating log entry. Information associated with the performance of the transformer is illustrated based on real time data accessed by the application executing on the mobile device. The user can enter additional data regarding the overheating transformer, as shown at interface 661.

The templates can be generated using particular navigation paradigms (e.g., rules). Different navigation approaches (such as hierarchical, flat, etc.) may be employed to provide a user with a familiar, and consistent, experience throughout an application, as shown in FIG. 6K.

In some implementations, navigation in SAP FIORI for iOS® follows standard native navigation paradigms. When a user navigates to a new screen, the user's system default navigation is in place. The user starts from the home screen and navigates forward into the apps through multiple screens. The ubiquitous back navigation function allows the user to go back to the previous screen. Forward navigation to other screens of the app or other apps is triggered by links, line items, buttons, or other UI elements. No distinction is made between navigation targets that are technically within the same app and those that go to another app. Tapping on a line item can either trigger direct navigation or open a quick overview. In the quick overview, further navigation targets can be reached. This behavior may be consistent within an app. For example, line items in one table either open quick views or navigate to another page.

FIG. 6L depicts a number of color selections for templates used to generate functional application user interfaces. In some implementations, the colors selections may be applied per template type. For example, particular color selections may be provided for a primary template 662, a semantic template 663 and emphasis template 664, a background template 665, and/or a secondary template 666. Such color examples are shown in FIG. 6L. The primary colors 662 may be applied to application borders and text, while the semantic colors 663 may be applied to meaningful data within an application. Background colors 665 may be applied to a background in particular user interfaces of the application. Secondary colors 666 may be developer selected to pertain to particular branding (e.g., operating systems, user type, company running the application, etc.).

In some implementations, particular rules may apply to using colors in applications. For example, one rule may indicate that active content on a navigation bar can use a light tint of a chosen primary application color. Similarly, another rule may indicate that content that is inactive on the navigation bar can use white text. Another example color rule may include indicating to not apply a dark tint color to information that is inactive in a content area.

FIG. 6M depicts a screenshot 667 showing examples of using color rules in applications. Such example color rules can ensure that a customer's brand identity is preserved in applications developed for use with customer data. If the brand/customer is Apple Inc., in order to preserve a customer's brand identity, an app-specific color palette for the brand can be generated to, for example, replace default colors of SAP FIORI for iOS® with the Apple Inc. preferred colors. A user interface 668 depicts an example of a primary color in which no content stands out from other content. A user interface 669 depicts an example of emphasizing color using color or bolding shown at 670, 671, 672, and 673. Although black bold outline is shown for clarity in this disclosure, any color, shade, or pattern can be configured for an emphasis color. A user interface 674 depicts an example of a semantic color palette in which particular colors or patterns are applied to data that may have meaning to a particular user. Here, dotted lines pertain to the peanut, corn, morphine, and penicillin indicators in the report 675. Similarly, a line graph 676 and a progress indicator 677 may have particular importance to the user and thus may be depicted in a color or pattern other than the primary or emphasis color/pattern.

This custom color palette may be composed of a primary color along with dark and light tints of that color. A color contrast ratio calculator may be used to ensure that all colors in the custom design will meet the minimum color contrast ratio of 4.5:1 (or preferred contrast ratio of 7.5:1) to fulfill accessibility standards.

Should a chosen primary color interfere with SAP FIORI for iOS® semantic colors, or should it fail to meet the standards of accessible color contrast ratios, a color hue can then be developed using a tinter/shader tool and color contrast ratio calculator. By using these tools, the customer would be able to identify a tonal value that offers users an adequate level of color contrast. A customer's brand is preserved by applying brand colors on components.

In an example, a customer may have a similar color palette to the SAP FIORI for iOS® primary colors and may wish to design an application. A color pattern can be selected that includes at least one primary color and light and dark tint colors based on the primary color. To develop the tint colors, the developer can use the tinter/shader tool to view all hue values of the primary color. The user can then use a color contrast ration calculator to identify color values with at least the minimum contrast ratio of 4.5:1 (or a recommended contrast ratio of 7.5:1). This may ensure sufficient readability and meet accessibility standards.

In the header of the application described above, the brand's primary color may be used for the background and the light tint color on text to indicate that the content is active. In the content area, the dark tint color may be applied to active content. In some implementations, semantic colors help to clearly display the value of data points in either a positive, negative, or critical manner.

In another example, a customer's primary colors may be similar to the SAP FIORI for iOS® semantic colors. The design language described herein may enable a user to choose a primary color from a particular brand's color palette that is distinct from the SAP FIORI for iOS® semantic colors. A typical color palette is made up of at least one primary color and light and dark tint colors based on the primary color. To develop the tint colors, a tinter/shader tool can be used to view all hue values of the primary color. A Color Contrast Ratio Calculator can be used to identify color values with at least the minimum contrast ratio of 4.5:1 (and ideally the recommended contrast ratio of 7.5:1). This will ensure sufficient readability and meet accessibility standards.

FIG. 6N depicts a screenshot 678 of a user interface of selectable patterns (e.g., templates) used to generate functional application user interfaces. For example, screenshot 678 includes a number of selectable icons that can be integrated into an application. Example icons include a documents icon 679A, a report icon 679B, a summary icon 679C, a medication list icon 679D, a history icon 679E, a CT scan icon 679F, a brightness icon 679G, an audio icon 679H, a color picker icon 679I, a male icon 679J, a female icon 679K, a lab report icon 679L, an eraser icon 679M, a text icon 679N, a my community icon 679O, a calendar icon 679P, an undo icon 679Q, a redo icon 679R, an add photo icon 679S, an info icon 679T, and a my schedule icon 679U, FIG. 6O depicts a screenshot of a sequence of user interfaces that may be used as templates in designing applications. A user may select an application icon 681 to enter into a login interface 682 in which login credentials can be entered. The user may then be provided access to a number of inside applications in which the user can interface, as shown in interface 683.

FIG. 6P depicts a mobile device 684A-684D with examples of four separate and personalized user interfaces 685A-685D. Each interface 685A-685D may be developed using the systems and methods described herein to provide a particular look and feel for a user or industry for which the interface is developed. For example, interface 685A depicts an electronic medical record login screen for a particular user. Interface 685B depicts an asset field maintenance login screen for another user. Interface 685C includes a project manager login screen for yet another user. Interface 685D includes a sales advisor login screen for another user. Upon login, each interface 685A-685D may provide different application functionality.

In general, the user interfaces described herein can be generated using various aspects of FIORI Smart Templates and assets. Additional assets (e.g., templates) may include a range of controls that leverage for example, standard controls that are provided by an operating system. Optionally, a number of additional, enhanced, etc. controls may also be possible including for example a flexible, extensible, and dynamic set of Key Performance Indicator (KPI) mechanisms (e.g., FIG. 6C). A combined navigation bar and header may also be provided (e.g., FIG. 6D). Enhanced entry mechanisms such as a flexible, extensible, and dynamically customizable keyboard templates may be provided (e.g., FIG. 6E and FIG. 8A and FIG. 8B. Color palettes and color templates may be provided (e.g., FIG. 6L and FIG. 6M). Iconography templates may be provided (e.g., FIG. 6N). Branding templates may also be provided (e.g., FIG. 6O and FIG. 6P).

FIGS. 7A-7E depict example aspects of applications generated by the systems and methods disclosed herein. In the examples in FIGS. 7A-7E, various devices are shown including, but not limited to a tablet, a smart watch, and a mobile device. Each interface generated can be specified to be scaled up or down depending on the device. The scaling may also include addition or removal of on screen selectable functions. For example, if an application is developed for a tablet, a similar version of the application may be presented on a smart watch by paring back selectable items from an entry screen. The missing content can be provided in other ways on the smart watch (e.g., menus, slide-out dialogs, links, etc.).

Employing the systems and methods described herein, it is possible to design and construct any number of interesting, compliant applications (e.g., Apps). For just a very few of the Apps that are possible, see for example FIG. 7A (an electronic medical record context), FIG. 7B (an asset field maintenance context), FIG. 7C (a Project management context), FIG. 7D (a retail sales associate context), and FIG. 7E (depicting aspects of an application on a smart watch).

Among other benefits, advantages, etc., such Apps may enjoy for example and inter alia access to various resources of a target device (for example a camera, a microphone, an accelerometer, etc.); the ability to access, consume, etc. data when a target device is offline.

Figure 7A:
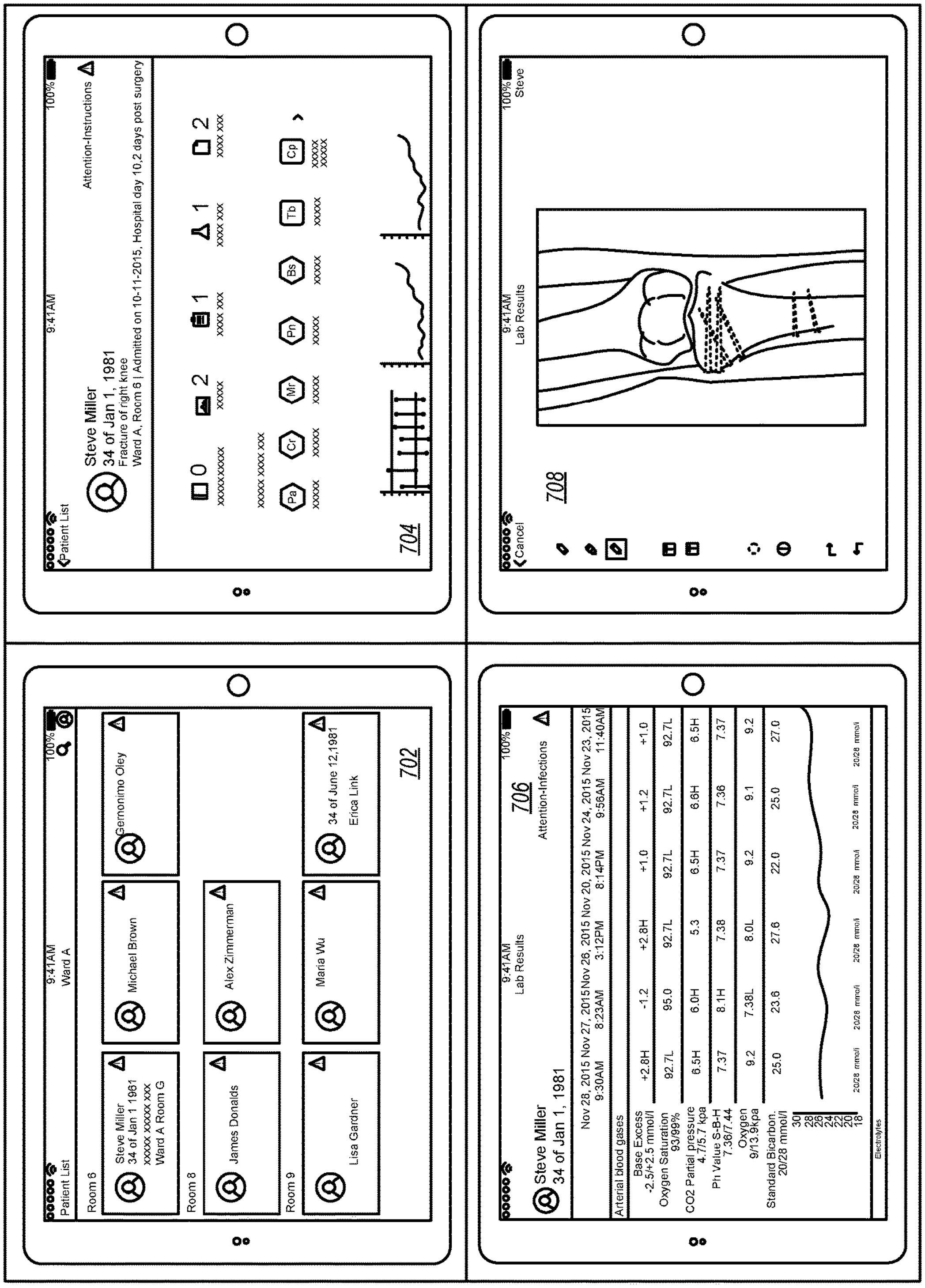
FIGS. 7A-7E depict example aspects of applications generated by the systems and methods disclosed herein.

Referring to FIG. 7A, four different user interfaces 702-708 are depicted for an electronic medical record application generated by the systems and methods described herein. The interfaces 702-208 are displayed on a tablet device. In some implementations, other mobile and/or computing devices can display similar or identical interfaces.

The interface 702 may be constructed by the systems and methods described herein. For example, a developer/user may utilize components shown in FIG. 1 through FIG. 5 to select templates to build the interface 702. In this example, the developer may have selected a navigation bar template 601 and a number of table view templates 603. The selected templates 601 and 603 can be used to design the patient ward content shown in interface 702. User data can be populated from any number of storage devices.

Interface 704 may be constructed by the systems and methods described herein. For example, a developer/user may utilize components shown in FIG. 1 through FIG. 5 to select templates to build the interface 704. In this example, the developer may have selected a navigation bar template 601, any number of trend/progress templates 617-624, and a number of other templates to generate the interface 704. The user content may be populated from any data source.

Interface 706 may be constructed by the systems and methods described herein. For example, a developer/user may utilize components shown in FIG. 1 through FIG. 5 to select templates to build the interface 706. In this example, the developer may have selected a navigation bar template 601, and a graphing template 622 and a number of other templates to generate the reporting lab results shown in interface 706.

Interface 708 may be constructed by the systems and methods described herein. For example, a developer/user may utilize components shown in FIG. 1 through FIG. 5 to select templates to build the interface 708. In this example, the developer may have chosen a freeform template in which user data is displayed in full screen mode (e.g., the X-Ray). The developer may have selected an interactive tool template to provide a menu of tools to interact with the user data.

Figure 7B:
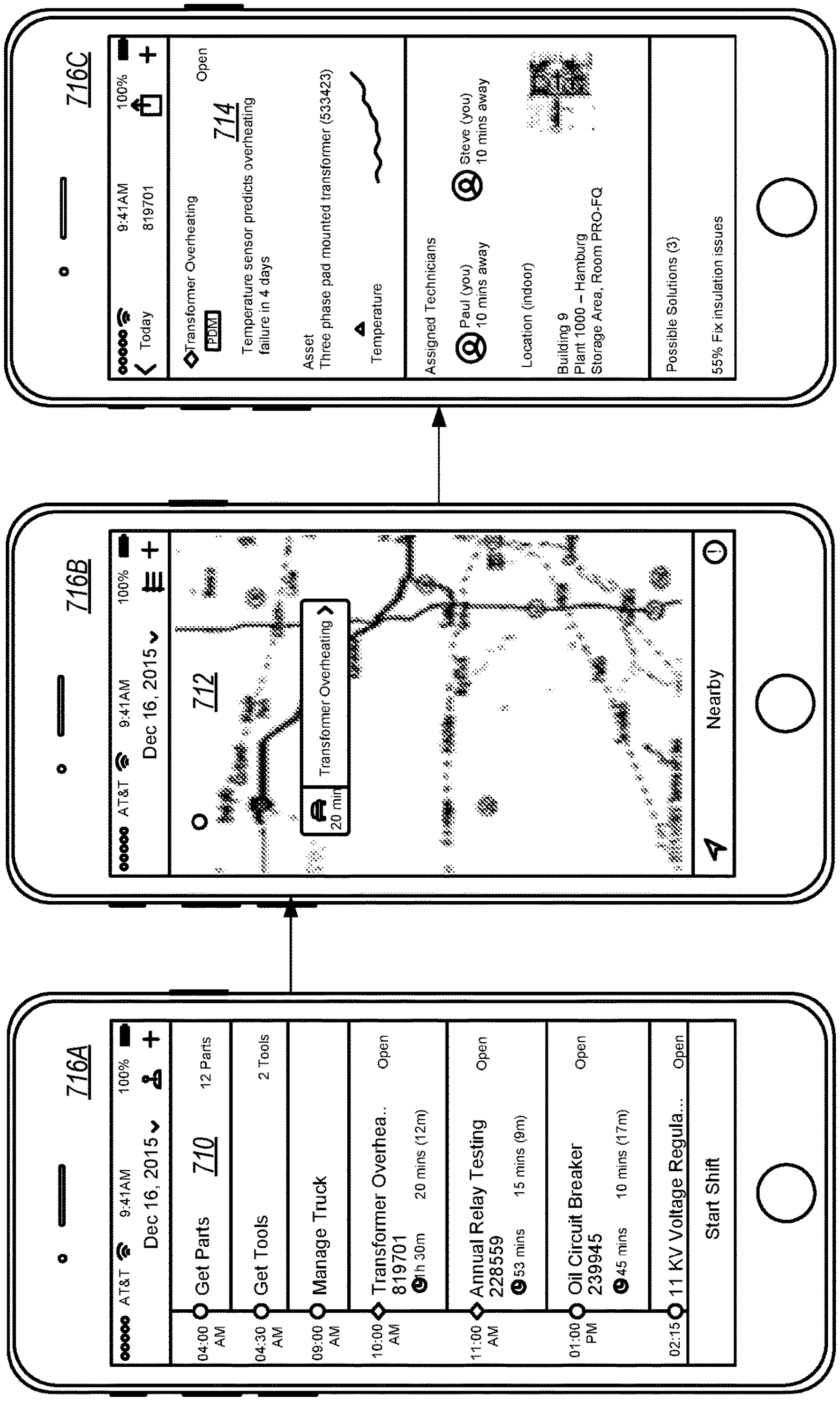

FIG. 7B depicts example aspects of an asset field maintenance application generated by the systems and methods described herein. Here, the interfaces 710, 712, and 714 were developed for mobile device 716 (e.g., as shown in 716A, 716B, and 716C). In the example of interface 710, a developer may have selected a navigation bar interface 601 at the top of the interface and a timeline template to generate the timeline.

Interface 712 may be constructed by the systems and methods described herein. For example, a developer/user may utilize components shown in FIG. 1 through FIG. 5 to select templates to build the interface. In this example, the developer may have selected a map template and a tools template to generate content in the interface for the asset field maintenance application.

Interface 714 may be constructed by the systems and methods described herein. For example, a developer/user may utilize components shown in FIG. 1 through FIG. 5 to select templates to build the interface. In this example, the developer may have selected a graphing template 622, a notification template 624, and a project information template 618 to generate and populate content in interface 714.

Figure 7C:
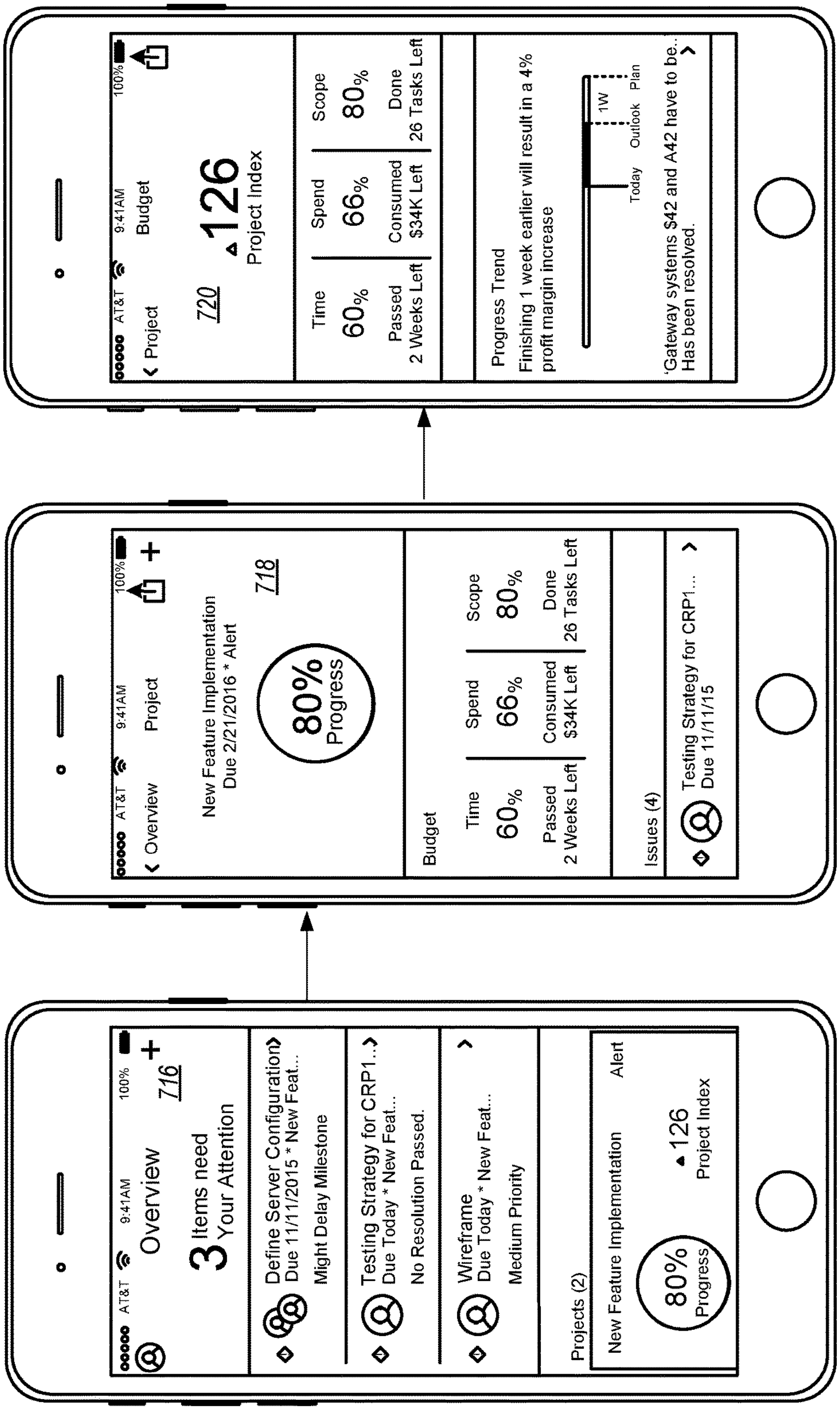

FIG. 7C depicts example aspects of a Project management application generated by the systems and methods described herein. Here, the interfaces 716, 718, and 720 were developed for a mobile device. In the example of interfaces 716-720, a developer may have utilized components shown in FIG. 1 through FIG. 5 to select templates to build the interfaces.

Figure 7D:
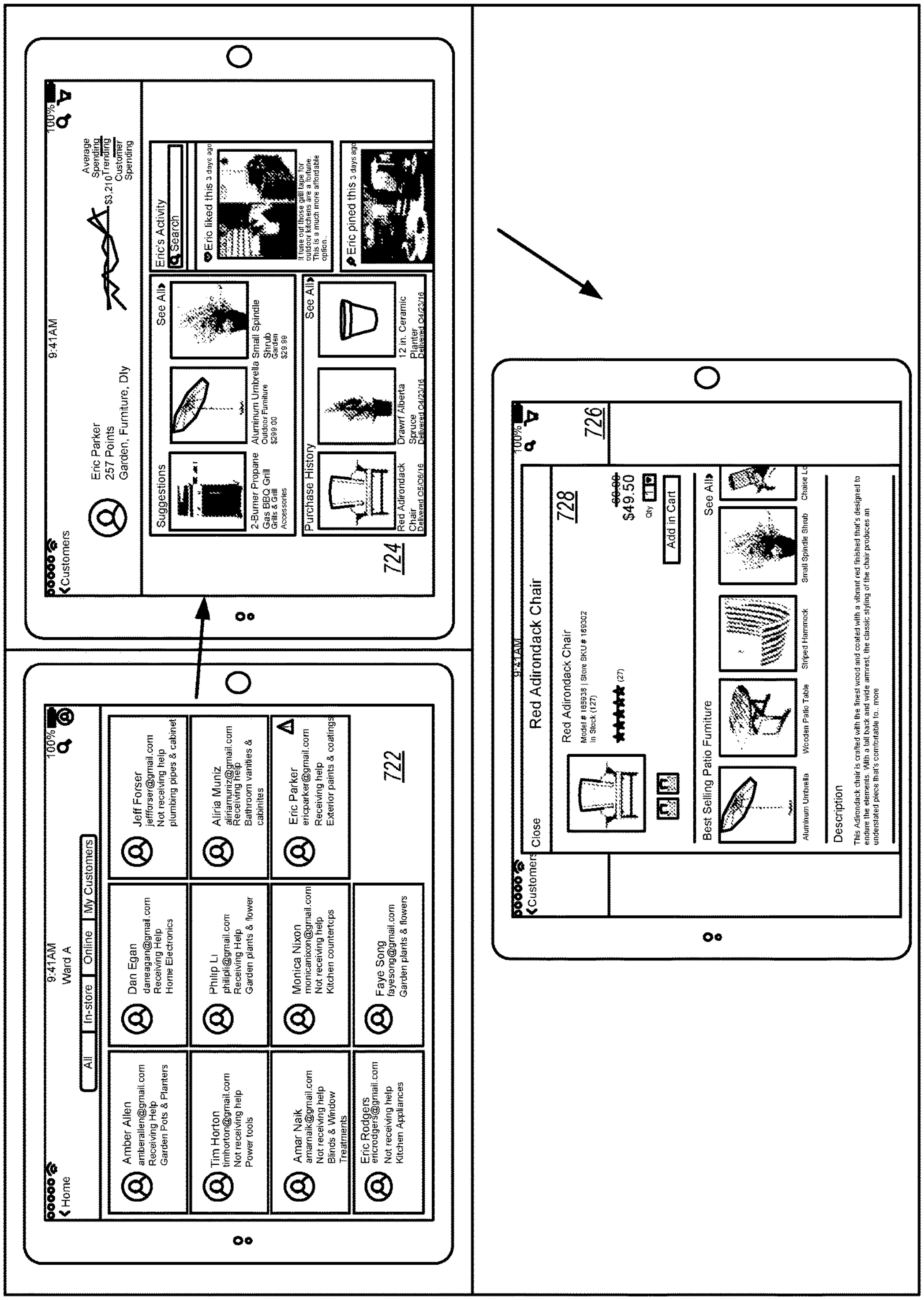

FIG. 7D depicts example aspects of a retail sales associate application generated by the systems and methods described herein. Here, the interfaces 722, 724, and 726 were developed for a tablet device. In the example of interfaces 722-724, a developer may have utilized components shown in FIG. 1 through FIG. 5 to select templates to build the interfaces. As shown in interface 726, additional dialogs 728 can be generated within an application.

Figure 7E:
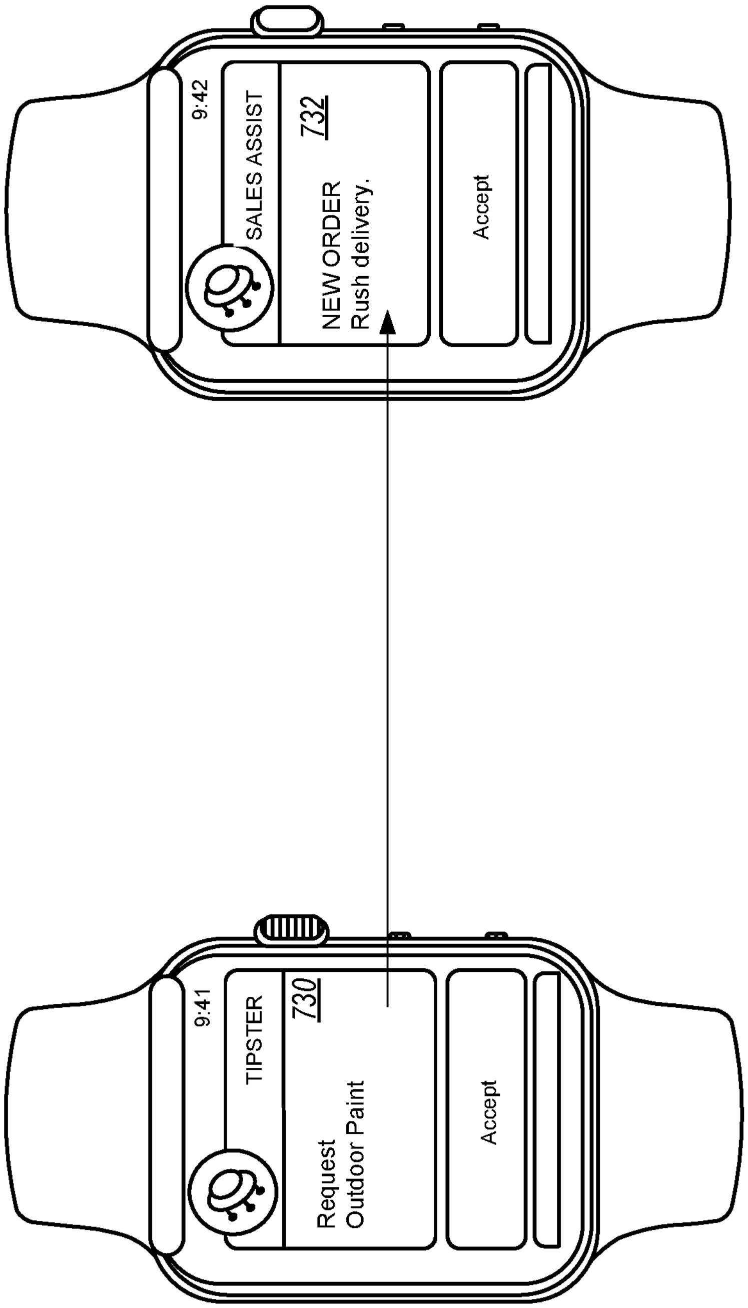

FIG. 7E depicts example aspects of a smart watch application generated by the systems and methods described herein. Here, a first interface 730 for purchasing content in an application and a second interface 732 as the user drills into the sales order process. The interfaces 730 and 732 may be generated by the systems and methods described herein. In the example of interfaces 730-732, a developer may have utilized components shown in FIG. 1 through FIG. 5 to select templates to build the interfaces.

Figure 8A:
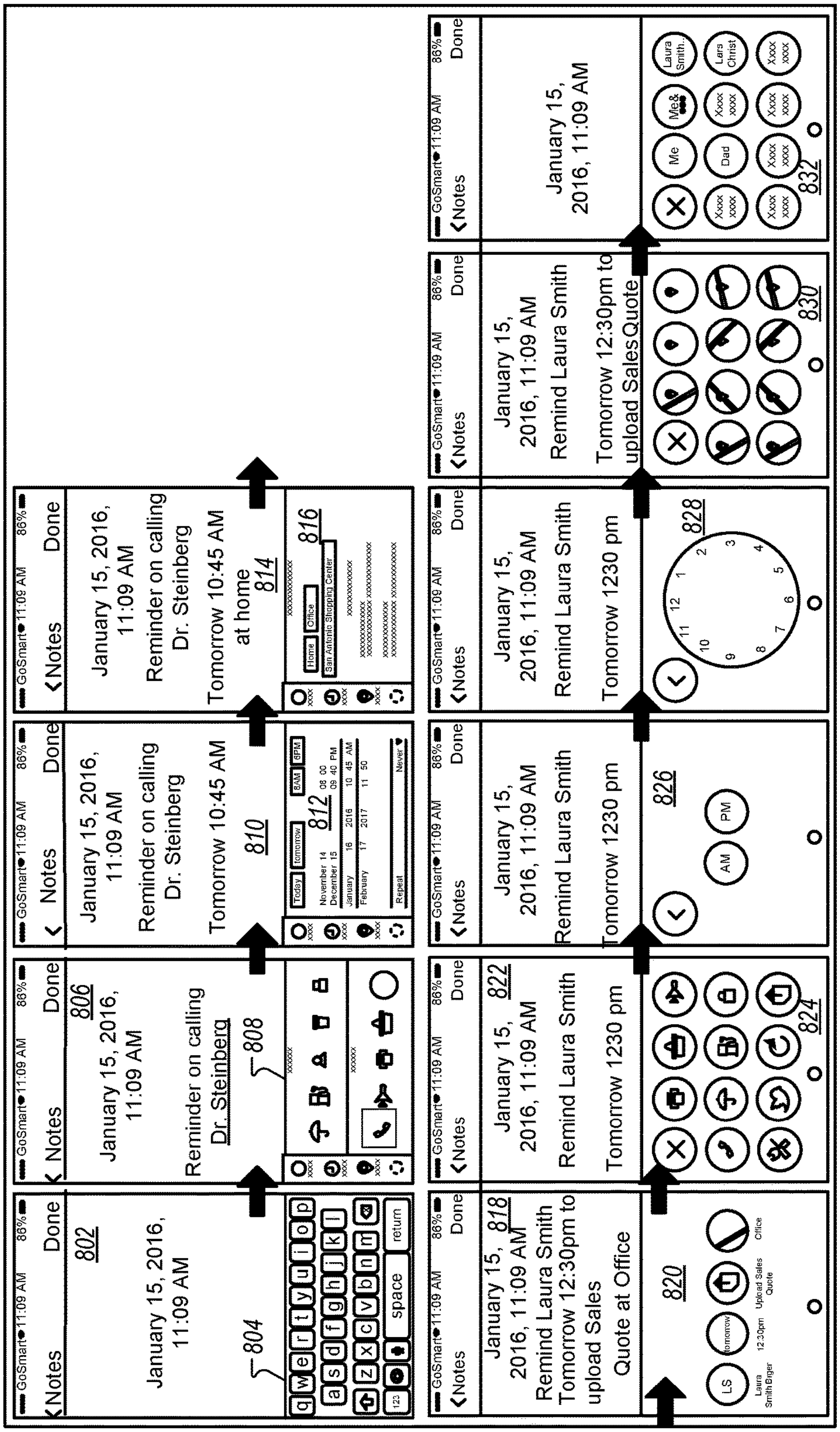
FIGS. 8A-8B depict example custom entry mechanisms generated by the systems and methods disclosed herein.
Figure 8B:
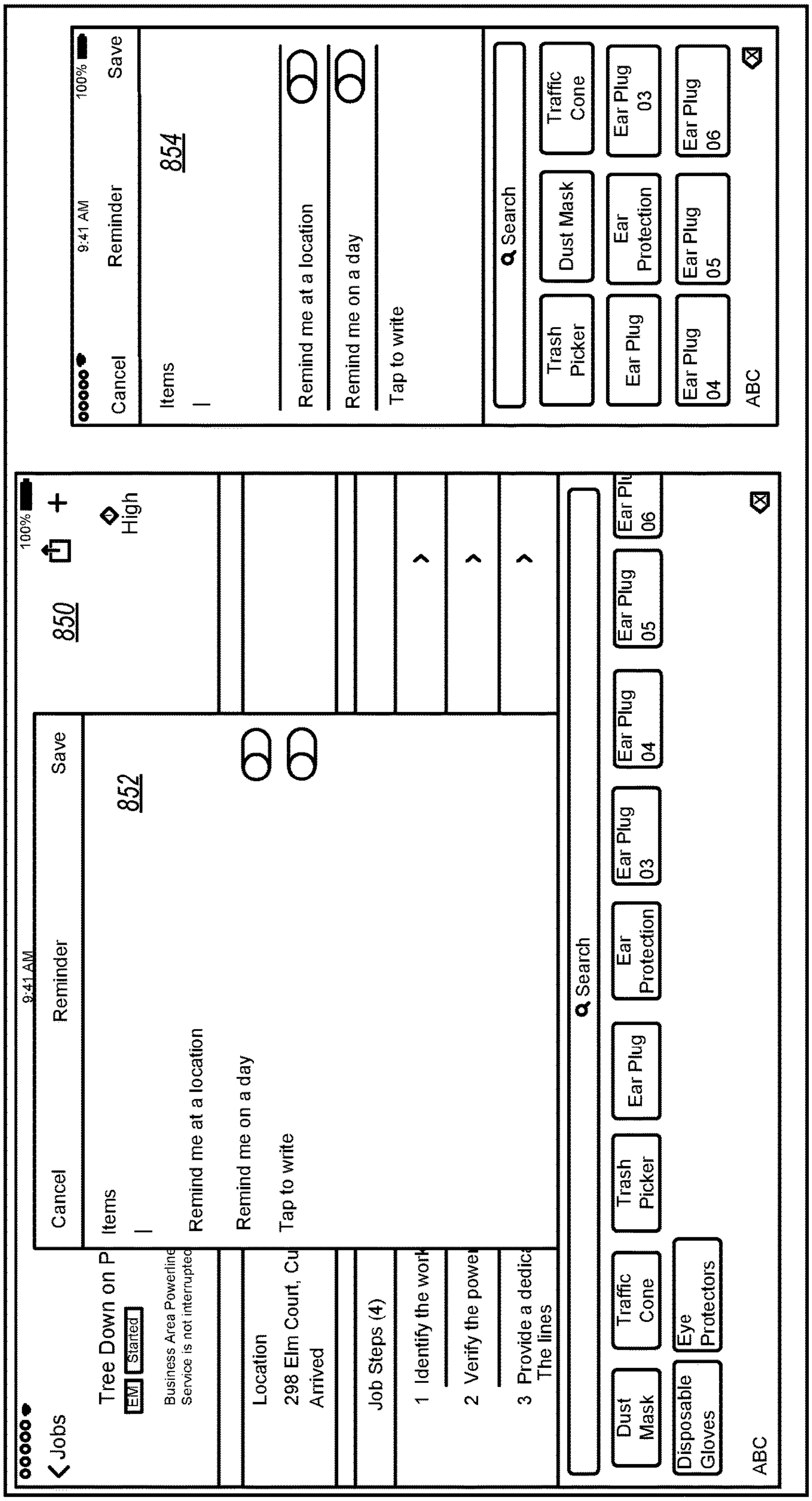

FIGS. 8A-8B depict example custom entry mechanisms generated by the systems and methods disclosed herein. At interface 802, a keyboard 804 is provided to the user in a form of a software keyboard. For example, when the application was developed, a developer may have used the application design module 242 to select a keyboard template. During execution of the application, the user can use the keyboard to enter a reminder. Once the user enters text regarding a reminder, at interface 806, another input mechanism 808 may be provided to enable users to set specific reminder types. For example, the user can select an icon from the input mechanism 808 to add to a reminder. The icon here may indicate a phone number contact to automatically enter the contact information into the reminder. At interface 810, another input interface 812 may be provided to enable the user to schedule a time of the reminder. The input interface 812 may be based on a picker template selected by a developer that generated the application.

At interface 814, the reminder includes a time and another input mechanism 816 is provided to select a location to be associated with the reminder. Additional details can be added to such reminder content (or other application content) using additional input interfaces based on any number of templates used to develop applications. For example, interface 818 can provide a type of activity input interface 820 in which a user can add activity notes and functionality to application content. In addition, a user may be provided additional input interfaces (e.g., interface 826, 828, 830, and 832).

FIG. 8B depicts an example interface 850 developed using the templates described herein. The interface 850 includes template components directed to tasks to be carried out on a job site. The template components may pertain to job categories and/or tasks as well as data entry for information and/or materials associated with job categories or tasks. For example, a user can enter the application to enter job steps in a text field, add reminders (e.g., dialog 852 and/or dialog 854), add items to a job list, enter address information, customer information and/or other job related content.

Figure 9:
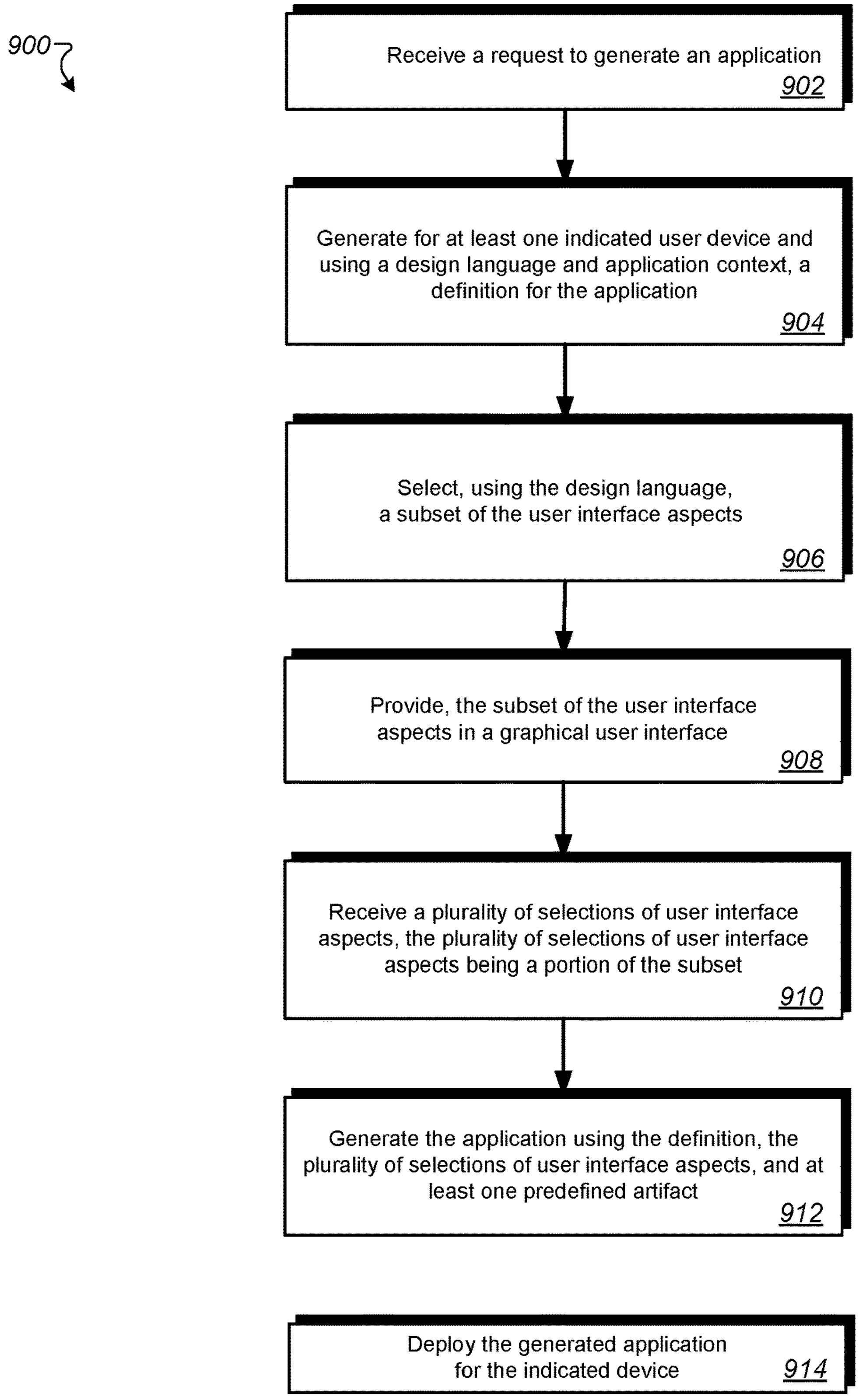
FIG. 9 is an illustration of an example process for generating a software application.

FIG. 9 is an illustration of an example process 900 for generating a software application. The process 900 may include receiving (902) a request to generate an application. The request may include at least one user device indication and an application context. In some implementations, the request also includes an identification of a specification of an Integrated Development Environment (IDE).

The process 900 may also include generating (904), for the at least one indicated user device and using a design language and the application context, a definition for the application. For example, the design language may include a plurality of user interface aspects. For example, the design language may provide floorplans, views, patterns, and frameworks for any number of user interface aspects, as discussed in detail above.

The process 900 may also include selecting (906), using the design language, a subset of the user interface aspects. The subset of the user interface aspects may be selected based on the definition and the at least one indicated user device. In some implementations, the design language specifies, for the application, at least one template, at least one layout, at least one user interface asset, and at least one navigation paradigm, as described in detail above. In general, the user interface aspects of the generated application are operable on any combination of one or more of a desktop computer, a laptop computer, a notebook computer, a tablet computing device, a smart phone, a smart watch, a Personal Digital Assistant (PDA), and a handheld computing device. In addition, the user interface aspects of the generated application are operable on any combination of one or more of a native environment, a web-based environment, a hybrid environment, and a containerized environment.

The process 900 may also include providing (908) the subset of the user interface aspects in a graphical user interface. For example, the design language may take into account a context, a device type, an operating system, a user request, a user interface requirement, or other information when selecting the subset of combinable user interface aspects for a user to select from. Such aspects may be ensured to function together in an application/interface.

The process 900 may also include receiving (910) a plurality of selections of user interface aspects. The plurality of selections of user interface aspects may be a portion of the subset. For example, the user (e.g., an end user at design time) may select particular user interface aspects from the subset to be added at runtime of the application being generated/built.

The process 900 may also include generating (912), using the definition, the plurality of selections of user interface aspects, and at least one predefined artifact, the application. For example, the at least one predefined artifact may include any or all of a library, a template, a user experience definition, a Software Development Kit (SDK), and a user interface standard. In some implementations, the generated application includes configuration information for executing the application. In some implementations, the generated application includes a user interface providing a user experience (e.g., FIORI UX) based at least in part on the context and the indicated device.

The process 900 may also include deploying (914) the generated application for the indicated device. Deploying the application may include leveraging any number of artifacts (such as output from an application construction module 252) to package, validate, publish, release, announce, and/or push an application to a user accessing a computing system.

In some implementations, one or more of specifying the App, generating the App, and deploying the application is carried out using any combination of one or more of an on-premise environment, a cloud environment, a Software as a Service environment, an edge computing environment, a grid computing environment, and a Platform as a Service environment, as described in detail above.

As noted previously, portions of the above disclosure focused on certain specific target devices. It will be readily apparent to one or ordinary skill in the relevant art that numerous other target devices are easily possible.

Aspects of the above may employ any number of open (e.g., publicly available) and/or closed (e.g., proprietary) supporting elements, building blocks, etc. such as for example and inter alia SDKs, Application Programming Interfaces (APIs), libraries, etc.

Aspects of the above (including for example an application construction module 252) may involve any number of open (e.g., publicly available) and/or closed (e.g., proprietary) enabling technologies including for example and inter alia eXtensible Markup Language (XML), Java, HTML5, JavaScript, CSS, aspects of the Open Data Protocol (OData), Advanced Business Application Programming (ABAP), JavaScript Object Notation (JSON), regular expressions, etc.

Aspects of the above may be applicable to various elements of FIORI including for example, CoPilot.

For simplicity of exposition, in the above description specific numbers, materials and configurations are set forth in order to provide a thorough understanding of the present frameworks and methods and in order to meet statutory written description, enablement, and best-mode requirements. However, it will be apparent to one of ordinary skill in the relevant art that the presented frameworks, methods, etc. may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps can not be construed as necessarily order-dependent or being separate in their performance.

Various of the functions or algorithms described herein may be implemented in hardware, software or a combination of software and hardware. The software may include computer executable instructions stored on computer readable media such as memory or other type of storage devices. Further, described functions may correspond to modules, which may be software, hardware, firmware, or any combination thereof. Multiple functions may be performed in one or more modules as desired, and the embodiments described are merely examples.

For simplicity of exposition, the balance of the present disclosure may refer to a number of specific target devices—such as an Apple Inc. iPad®, an Apple Inc. iPhone®, and an Apple Inc. watch (e.g., a smart watch), all powered by for example the Apple Inc. iOS® operating system—but it will be readily apparent to one of ordinary skill in the relevant art that numerous other target devices, powered by for example any number of different operating systems, are easily possible.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A server may include one or more computers. A computer may include, among other things, a memory and a processor. Various types of computers may be employed for the server. For example, such a computer may be a mainframe, a workstation, as well as other types of processing devices. The memory of a computer may include any number of forms, types, etc. The memory may be volatile or non-volatile types of non-transitory computer-readable media, such as magnetic media, optical media, Random Access Memory (RAM), Read-Only Memory (ROM), removable media, or any other suitable local or remote memory component.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In general, the systems described herein may be configured to execute in a multi-layer architecture including, but not limited to a user interface layer, a services layer, a business object layer, and an application server. Data associated with one or more operational parameters may be collected from each of at least two of the layers of the computing system. Additionally, user-generated input may be received which is operable to initiate a generation of a message associated with cleansing or modifying address data on a standalone server or client, or in the cloud.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

A number of embodiments have been described. Nevertheless, it will be understood that various modifications may be made without departing from the spirit and scope of the present disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:

receiving a request to generate an application, the request including at least one user device indication and an application context, wherein the user device indication identifies a type of hardware device and the application context identifies a field of use for the application;

generating a definition for the application for the at least one indicated user device automatically using a design language and the application context, the design language including a plurality of user interface aspects;

selecting a subset of the user interface aspects automatically using the design language, the subset of the user interface aspects being selected based on the definition and the at least one indicated user device;

providing the subset of the user interface aspects in a graphical user interface;

receiving, via the graphical user interface, a plurality of selections of user interface aspects, the plurality of selections of user interface aspects being a portion of the subset of the user interface aspects;

automatically generating the application using the definition, the plurality of selections of user interface aspects, and at least one predefined artifact; and deploying the generated application for the indicated device.

2. The computer-implemented method of claim 1, wherein the generated application includes configuration information for executing the application and a user interface providing a user experience based at least in part on the context and the indicated device.

3. The computer-implemented method of claim 1, wherein the request further comprises identification of a specification of an Integrated Development Environment (IDE).

4. The computer-implemented method of claim 1, wherein the design language specifies, for the application, at least one template, at least one layout, at least one user interface asset, and at least one navigation paradigm.

5. The computer-implemented method of claim 1, wherein the at least one predefined artifact comprises a library, a template, a user experience definition, a Software Development Kit (SDK), and a user interface standard.

6. The computer-implemented method of claim 1, wherein the user interface aspects of the generated application are operable on any combination of one or more of a desktop computer, a laptop computer, a notebook computer, a tablet computing device, a smart phone, a smart watch, a Personal Digital Assistant (PDA), and a handheld computing device.

7. The computer-implemented method of claim 1, wherein the user interface aspects of the generated application are operable on any combination of one or more of a native environment, a web-based environment, a hybrid environment, and a containerized environment.

8. A computer-implemented system for generating a software application, the system comprising:

at least one processor; memory storing instructions that, when executed by the at least one processor, cause the system to perform operations including, receiving a request to generate an application, the request including at least one user device indication and an application context, wherein the user device indication identifies a type of hardware device and the application context identifies a field of use for the application;

generating a definition for the application for the at least one indicated user device automatically using a design language and the application context, the design language including a plurality of user interface aspects;

selecting a subset of the user interface aspects automatically using the design language, the subset of the user interface aspects being selected based on the definition and the at least one indicated user device;

providing the subset of the user interface aspects in a graphical user interface;

receiving, via the graphical user interface, a plurality of selections of user interface aspects, the plurality of selections of user interface aspects being a portion of the subset of the user interface aspects;

automatically generating the application using the definition, the plurality of selections of user interface aspects, and at least one predefined artifact; and deploying the generated application for the indicated device.

9. The computer-implemented system of claim 8, wherein the generated application includes configuration information for executing the application and a user interface providing a user experience based at least in part on the context and the indicated device.

10. The computer-implemented system of claim 8, wherein the request further comprises identification of a specification of an Integrated Development Environment (IDE).

11. The computer-implemented system of claim 8, wherein the design language specifies, for the application, at least one template, at least one layout, at least one user interface asset, and at least one navigation paradigm.

12. The computer-implemented system of claim 8, wherein the at least one predefined artifact comprises a library, a template, a user experience definition, a Software Development Kit (SDK), and a user interface standard.

13. The computer-implemented system of claim 8, wherein the user interface aspects of the generated application are operable on any combination of one or more of a desktop computer, a laptop computer, a notebook computer, a tablet computing device, a smart phone, a smart watch, a Personal Digital Assistant (PDA), and a handheld computing device.

14. The computer-implemented system of claim 8, wherein the user interface aspects of the generated application are operable on any combination of one or more of a native environment, a web-based environment, a hybrid environment, and a containerized environment.

15. A computer program product for generating a software application, the computer program product being tangibly embodied on a non-transitory computer-readable storage medium and comprising instructions that, when executed by at least one computing device, are configured to cause the at least one computing device to:

receive a request to generate an application, the request including at least one user device indication and an application context, wherein the user device indication identifies a type of hardware device and the application context identifies a field of use for the application;

generate a definition for the application for the at least one indicated user device automatically using a design language and the application context, the design language including a plurality of user interface aspects;

select a subset of the user interface aspects automatically using the design language, the subset of the user interface aspects being selected based on the definition and the at least one indicated user device;

provide the subset of the user interface aspects in a graphical user interface;

receive, via the graphical user interface, a plurality of selections of user interface aspects, the plurality of selections of user interface aspects being a portion of the subset of the user interface aspects;

automatically generate the application using the definition, the plurality of selections of user interface aspects, and at least one predefined artifact; and deploy the generated application for the indicated device.

16. The computer program product of claim 15, wherein the generated application includes configuration information for executing the application and a user interface providing a user experience based at least in part on the context and the indicated device.

17. The computer program product of claim 15, wherein the request further comprises identification of a specification of an Integrated Development Environment (IDE).

18. The computer program product of claim 15, wherein the design language specifies, for the application, at least one template, at least one layout, at least one user interface asset, and at least one navigation paradigm.

19. The computer program product of claim 15, wherein the user interface aspects of the generated application are operable on any combination of one or more of a native environment, a web-based environment, a hybrid environment, and a containerized environment.

20. The computer program product of claim 15, wherein the user interface aspects of the generated application are operable on any combination of one or more of a desktop computer, a laptop computer, a notebook computer, a tablet computing device, a smart phone, a smart watch, a Personal Digital Assistant (PDA), and a handheld computing device.

* * * * *